(12) United States Patent
Harris

(10) Patent No.: US 10,784,918 B2
(45) Date of Patent: Sep. 22, 2020

(54) DISCRETE SPECTRUM TRANSCEIVER

(71) Applicant: Discrete Partners, Inc., Acme, WA (US)

(72) Inventor: James C. Harris, Warrenton, VA (US)

(73) Assignee: Discrete Partners, Inc, Acme, WA (US)

( * ) Notice: Subject to any disclaimer, the term of this patent is extended or adjusted under 35 U.S.C. 154(b) by 0 days.

(21) Appl. No.: 16/571,866

(22) Filed: Sep. 16, 2019

(65) Prior Publication Data

US 2020/0091954 A1    Mar. 19, 2020

Related U.S. Application Data

(60) Provisional application No. 62/851,155, filed on May 22, 2019, provisional application No. 62/731,277, filed on Sep. 14, 2018.

(51) Int. Cl.
*H04B 1/405* (2015.01)
*H04B 1/69* (2011.01)

(52) U.S. Cl.
CPC ............ *H04B 1/405* (2013.01); *H04B 1/69* (2013.01); *H04B 2210/006* (2013.01)

(58) Field of Classification Search
CPC ..... H04B 1/405; H04B 1/69; H04B 2210/006
USPC ........................................................ 455/73
See application file for complete search history.

(56) References Cited

U.S. PATENT DOCUMENTS

| | | | |
|---|---|---|---|
| 4,761,545 A * | 8/1988 | Marshall | H01J 49/38 250/282 |
| 6,613,971 B1 | 9/2003 | Carpenter | |
| 8,103,168 B1 | 1/2012 | Enoch et al. | |
| 2002/0087203 A1* | 7/2002 | Schmitt | A61N 1/37211 607/60 |
| 2006/0025946 A1* | 2/2006 | Jenkins | G01R 23/16 702/76 |
| 2009/0323869 A1 | 12/2009 | Elam | |
| 2010/0286981 A1 | 11/2010 | Krini et al. | |
| 2014/0079248 A1 | 3/2014 | Short et al. | |
| 2014/0114591 A1 | 4/2014 | Broeckmann et al. | |
| 2015/0276981 A1 | 10/2015 | Bai et al. | |
| 2016/0087719 A1* | 3/2016 | Baggen | H04B 10/116 398/120 |

(Continued)

OTHER PUBLICATIONS

ISA, "International Search Report", PCT/US2019/051270, dated Jan. 21, 2020.

*Primary Examiner* — Eugene Yun
(74) *Attorney, Agent, or Firm* — Intrinsic Law Corp.

(57) ABSTRACT

A discrete spectrum (DS) signal transmitter includes a first circuit element comprising a DS signal generator that generates a plurality of DS signals, each DS signal having a different DS frequency, each DS frequency being (a) a harmonic of a fundamental frequency or (b) the fundamental frequency. A second circuit element receives as an input the DS signals and that generates as an output (a) a finite summation of the DS signals or (b) pulses that represent a mathematical equivalent of a summation of an infinite number of the DS signals. An antenna is electrically coupled to an output of the second circuit element. The analog DS signals transmitted by the DS signal transmitter are received by a DS signal receiver that converts the analog DS signals to DS discrete signals and performs a fast Fourier transform of the DS discrete signals.

24 Claims, 22 Drawing Sheets

(56) References Cited

U.S. PATENT DOCUMENTS

2018/0183469 A1* 6/2018 Arnold ................ H04B 1/0475

* cited by examiner

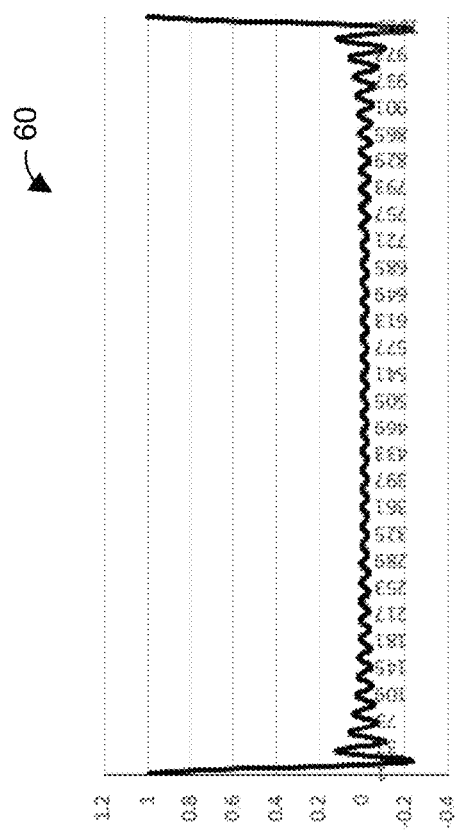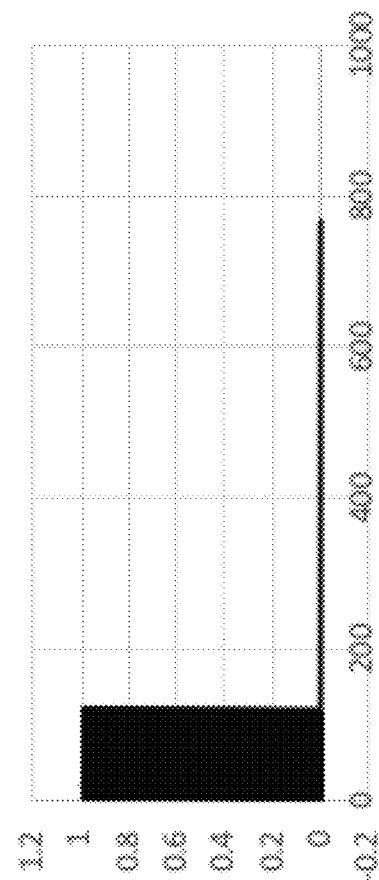
FIG. 6A
FIG. 6B

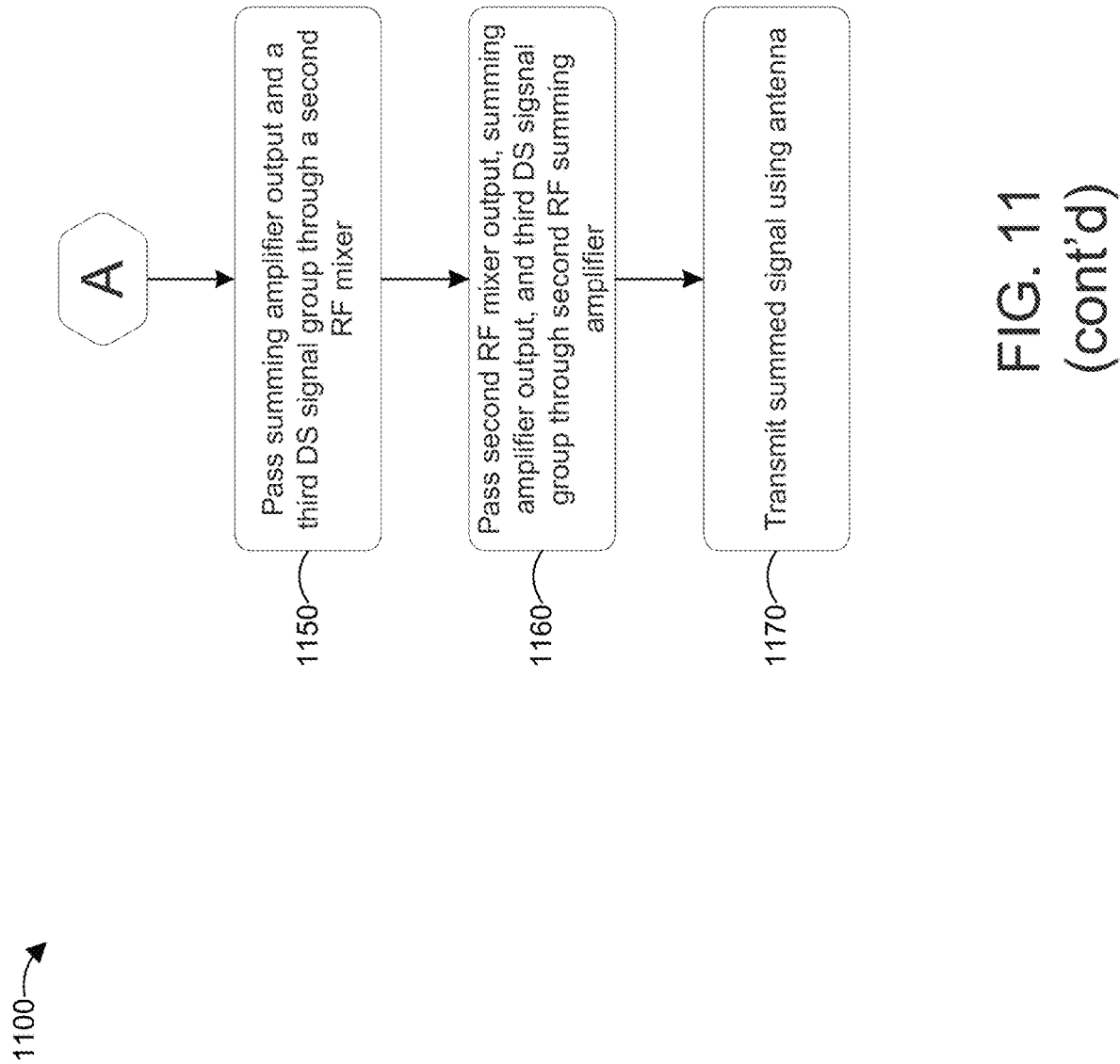

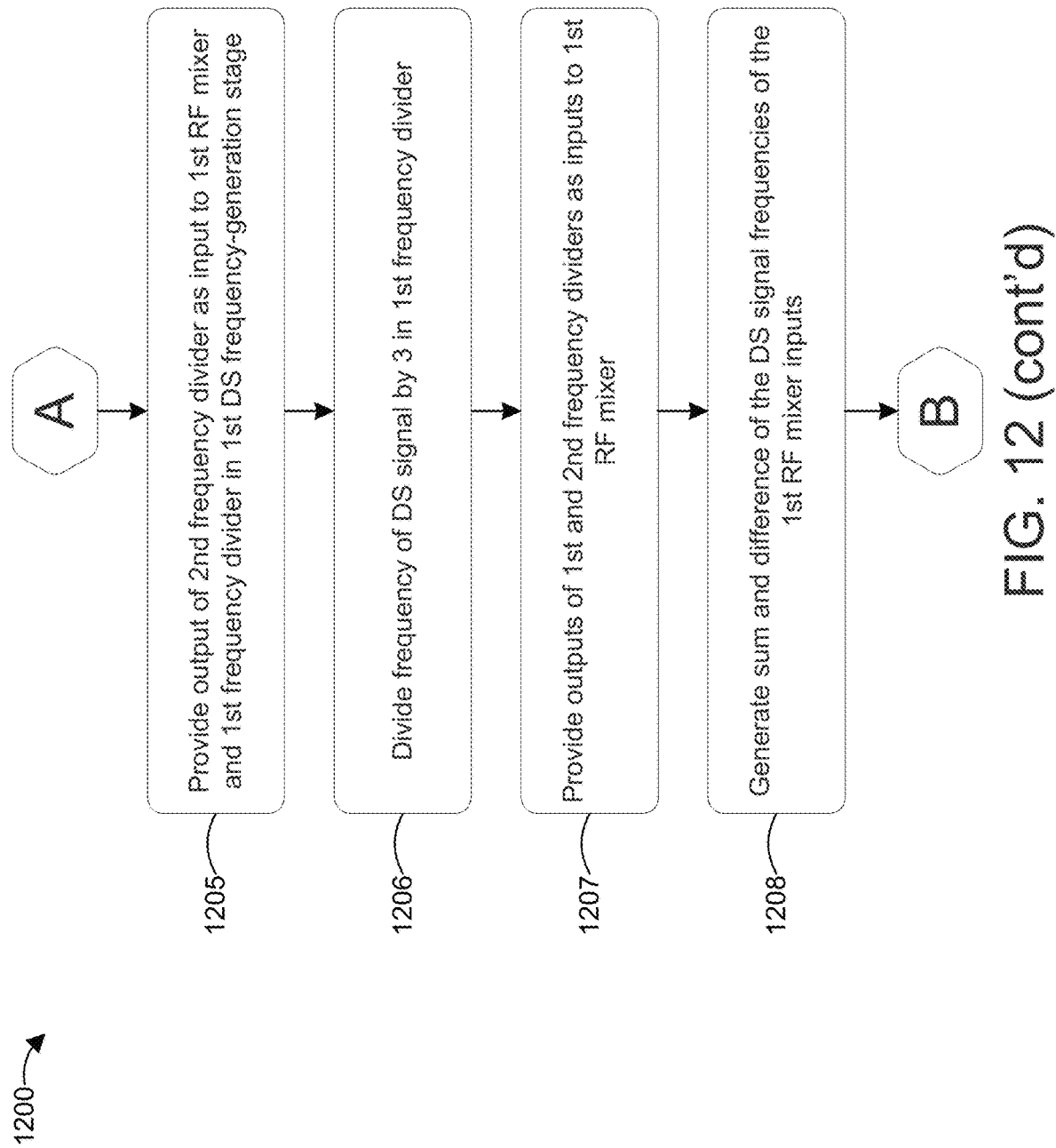

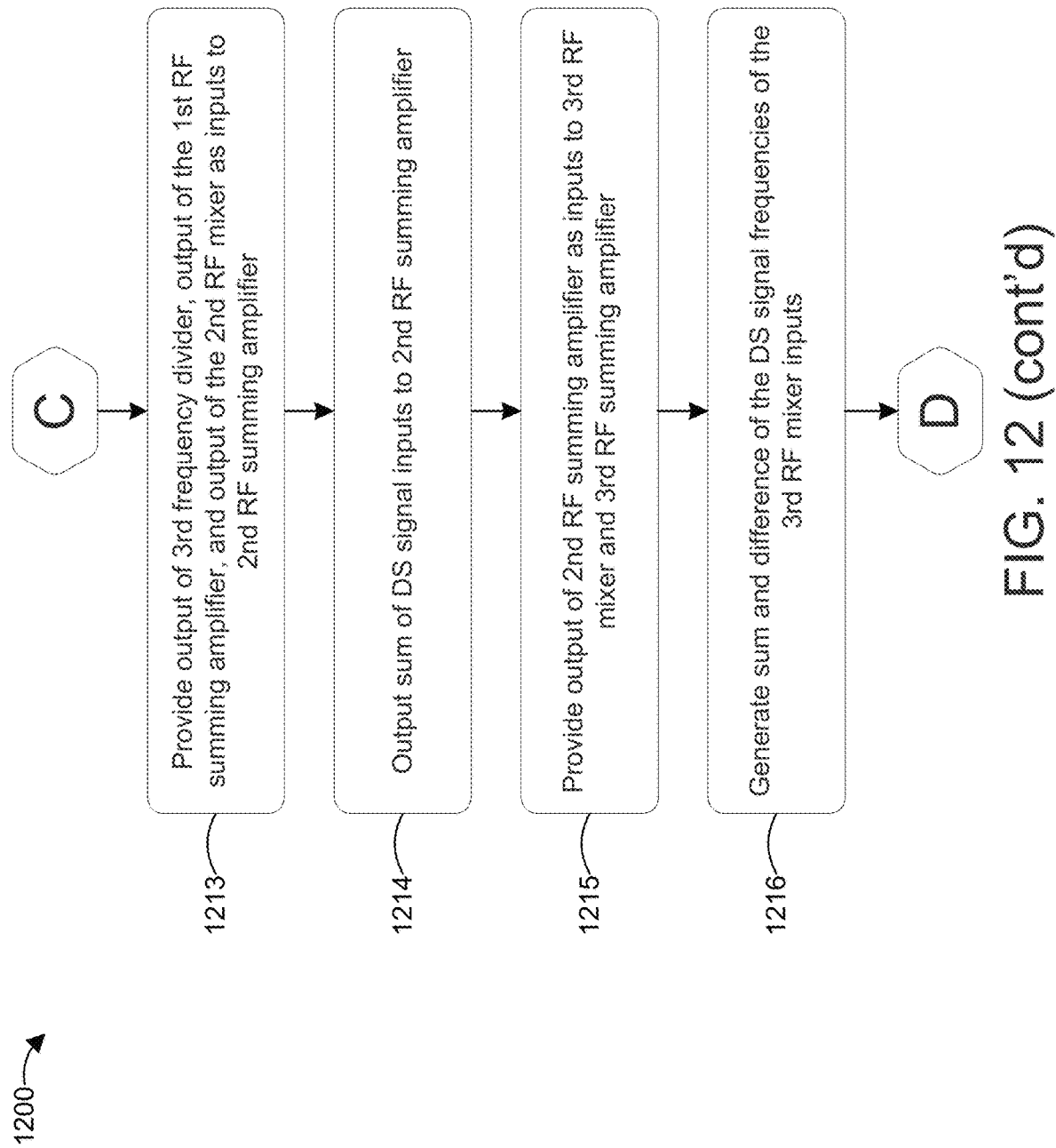

DISCRETE SPECTRUM TRANSCEIVER

RELATED APPLICATIONS

This application claims priority to U.S. Provisional Application No. 62/731,277, titled "System and Method for Signal Processing Using Discrete Sparse Narrow-Band Tone Sets," filed on Sep. 14, 2018, and to U.S. Provisional Application No. 62/851,155, titled "Discrete Spectrum Network Node Transceivers," filed on May 22, 2019, which are hereby incorporated by reference.

TECHNICAL FIELD

The present application relates generally to the transmission, reception, and processing of signals.

BACKGROUND

Conventional signal transmission methods and systems send and/or receive continuous analog signals, which sometimes require large bandwidth solutions and costly infrastructure to operate over already-crowded regulated communication channels.

It would be desirable to overcome these and/or other problems in the art.

SUMMARY

Example embodiments described herein have innovative features, no single one of which is indispensable or solely responsible for their desirable attributes. The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Without limiting the scope of the claims, some of the advantageous features will now be summarized. Other objects, advantages and novel features of the disclosure will be set forth in the following detailed description of the disclosure when considered in conjunction with the drawings, which are intended to illustrate, not limit, the invention.

An aspect of the invention is directed to a discrete spectrum (DS) signal transmitter comprising: a first circuit element comprising a DS signal generator that generates a plurality of DS signals, each DS signal having a different DS frequency, each DS frequency being (a) a harmonic of a fundamental frequency or (b) the fundamental frequency; a second circuit element that receives as an input the DS signals and that generates as an output (a) a finite summation of the DS signals or (b) pulses that represent a mathematical equivalent of a summation of an infinite number of the DS signals; and an antenna electrically coupled to the output of the second circuit element.

In one or more embodiments, the DS signal generator comprises a field-programmable gate array (FPGA). In one or more embodiments, the FPGA has an input to modify the DS frequencies of the DS signals. In one or more embodiments, the second circuit element further comprises: an RF mixer electrically coupled to the output of the DS signal generator; and an RF summing amplifier electrically coupled to an output of the RF mixer and to the output of the DS signal generator.

In one or more embodiments, the RF mixer receives a first group of the DS signals at a first RF mixer input and a second group of the DS signals at a second RF mixer input. In one or more embodiments, the first group of the DS signals is input to a first RF amplifier, an output of the first RF amplifier is electrically coupled to the first RF mixer input, the second group of the DS signals is input to a second RF amplifier, and an output of the second RF amplifier is electrically coupled to the second RF mixer input.

In one or more embodiments, the output of the RF mixer includes a sum and a difference of the respective DS signal frequencies in each group. In one or more embodiments, an output of the RF summing amplifier is electrically coupled to the antenna.

In one or more embodiments, the output of the RF summing amplifier comprises a contiguous set of DS frequencies. In one or more embodiments, the output of the RF summing amplifier comprises at least a partially-discontinuous set of DS frequencies.

In one or more embodiments, the RF summing amplifier is a first RF summing amplifier, and the RF mixer is a first RF mixer, and the second circuit element further comprises: a second RF mixer that receives as inputs: an output of the first RF summing amplifier; and a third group of the DS signals, the third group of the DS signals including at least one of the DS signals; and a second RF summing amplifier that receives as inputs: the output of the first RF summing amplifier; the third group of the DS signals; and an output of the second RF mixer. In one or more embodiments, the output of the second RF mixer includes a sum and a difference of the respective DS signal frequencies in the output of the first RF summing amplifier and the third group of the DS signals. In one or more embodiments, an output of the second RF summing amplifier is electrically coupled to the antenna.

In one or more embodiments, the output of the second RF summing amplifier comprises a contiguous set of DS frequencies. In one or more embodiments, the output of the RF summing amplifier comprises at least a partially-discontinuous set of DS frequencies.

In one or more embodiments, the second circuit element further comprises a pulse generator that receives as an input the DS signals and that outputs pulses of the DS signals to the antenna. In one or more embodiments, the second circuit element further comprises a plurality of signal-generation stages, each signal-generation stage comprising a frequency divider, an RF mixer, and an RF summing amplifier. In one or more embodiments, an input of the frequency divider in a first signal-generation stage is electrically coupled to an output of the frequency divider in a second signal-generation stage, and an input of the frequency divider in a second signal-generation stage is electrically coupled to an output of the frequency divider in the third signal-generation stage. In one or more embodiments, the RF mixer in the first signal-generation stage receives as inputs: an output of the frequency divider in the first signal-generation stage, and the output of the frequency divider in the second signal-generation stage, and the RF summing amplifier in the first signal-generation stage receives as inputs: the output of the frequency divider in the first signal-generation stage, the output of the frequency divider in the second signal-generation stage, and an output of the RF mixer in the first signal-generation stage.

In one or more embodiments, the RF mixer in the second signal-generation stage receives as inputs: an output of the RF summing amplifier in the first signal-generation stage, and the output of the frequency divider in the third signal-generation stage, and the RF summing amplifier in the second signal-generation stage receives as inputs: the output of the RF summing amplifier in the first signal-generation stage, the output of the frequency divider in the third signal-generation stage, and an output of the RF mixer in the second signal-generation stage. In one or more embodiments, the RF mixer in the third signal-generation stage receives as inputs: an output of the RF summing amplifier in the second signal-generation stage, and an input DS signal generated by the DS signal generator, and the RF summing amplifier in the third signal-generation stage receives as inputs: the output of the RF summing amplifier in the second signal-generation stage, the input DS signal, and an output of the RF mixer in the third signal-generation stage. In one or more embodiments, the DS frequency of the input DS signal is the 27th harmonic of the fundamental frequency. In one or more embodiments, each frequency divider divides the DS frequency of the DS signal at the input by 3.

In one or more embodiments, an output of the RF summing amplifier in the third signal-generation stage in electrically coupled to the antenna. In one or more embodiments, the output of the RF summing amplifier in the third signal-generation stage comprises a contiguous set of 40 DS frequencies. In one or more embodiments, an output of the RF summing amplifier in the third signal-generation stage in electrically coupled to a termination stage, the termination stage comprising a termination RF mixer and a termination RF summing amplifier. In one or more embodiments, the termination RF mixer has two inputs, each input electrically coupled to an output of the RF summing amplifier in the third signal-generation stage, and the termination RF summing amplifier is electrically coupled to an output of the termination RF mixer.

Another aspect of the invention is directed to a DS signal transceiver comprising: a DS signal transmitter as described above; and a DS signal receiver comprising: a receiver antenna; an RF front end having an input electrically coupled to an output of the receiver antenna; an analog-to-digital converter (ADC) having an input electrically coupled to an output of the RF front end; and a digital signal processor (DSP) having an input electrically coupled to an output of the ADC.

In one or more embodiments, the DSP generates a signal-domain output by performing a fast Fourier transform of a digital representation of DS signals received by the receiver antenna, the digital representation output by the ADC. In one or more embodiments, the DS signal generator of the DS signal transmitter comprises a field-programmable gate array (FPGA), and the digital representation output by the ADC includes header and data packets, and the FPGA performs detection processing to remove the header packets from the digital representation such that only the data packets are input to the DSP.

Yet another aspect of the invention is directed to a method for transmitting data, comprising: in a discrete spectrum (DS) signal generator, generating a plurality of DS signals having different DS frequencies, each DS frequency being (a) a harmonic of a fundamental frequency or (b) the fundamental frequency; forming first and second DS signal groups from the DS signals generated by the DS signal generator; passing the first and second DS signal groups through an RF mixer; generating RF mixer output signals that comprises a sum and a difference of the DS signals in the first DS signal group with respect to the DS signals in the second DS signal group; passing the RF mixer output signals, the first DS signal group, and the second DS signal group through an RF summing amplifier; generating an RF summing amplifier output signal having a frequency equal to a finite sum of the DS frequencies of the RF mixer output signals, of the first DS signal group, and of the second DS signal group; and transmitting the RF summing amplifier output signal using an antenna.

Another aspect of the invention is directed to a system for transmitting data, comprising: a first circuit element comprising a DS signal generator that generates a plurality of DS signals, each DS signal having a different DS frequency, each DS frequency being (a) a harmonic of a fundamental frequency or (b) the fundamental frequency; a second circuit element that receives as an input the DS signals and that generates as an output (a) a finite summation of the DS signals or (b) pulses that represent a mathematical equivalent of a summation of an infinite number of the DS signals; an antenna electrically coupled to the output of the second circuit element signal generator; and a microprocessor in electrical communication with the DS signal generator and with a data source, wherein the microprocessor generates output signals to the DS signal generator, the output signals causing the DS signal generator to modulate an amplitude of one or more of the DS signals to transmit data output from the data source.

BRIEF DESCRIPTION OF THE DRAWINGS

For a fuller understanding of the nature and advantages of the present concepts, reference is made to the following detailed description of preferred embodiments and in connection with the accompanying drawings.

FIG. 6A is a plot of pulses of 40 contiguous DS signal frequencies in the time or signal domain.

FIG. 6B is a plot of pulses of 40 contiguous DS signal frequencies in the frequency domain.

DETAILED DESCRIPTION

Discrete spectrum signals are transmitted simultaneously at different discrete frequencies that represent a discrete Fourier series. Each discrete frequency is (a) a harmonic of a fundamental frequency or (b) the fundamental frequency. The discrete spectrum signals do not include frequencies other than the discrete frequencies (a) and/or (b) Each discrete spectrum signal has a respective amplitude, which can be modulated to transmit data. A receiver can perform a fast Fourier transform (FFT) of the received signals to determine the amplitude and/or relative amplitude of each received discrete frequency. This provides a more efficient means for transmitting signals and data than conventional systems that use frequencies over a continuous range.

Figure 1:
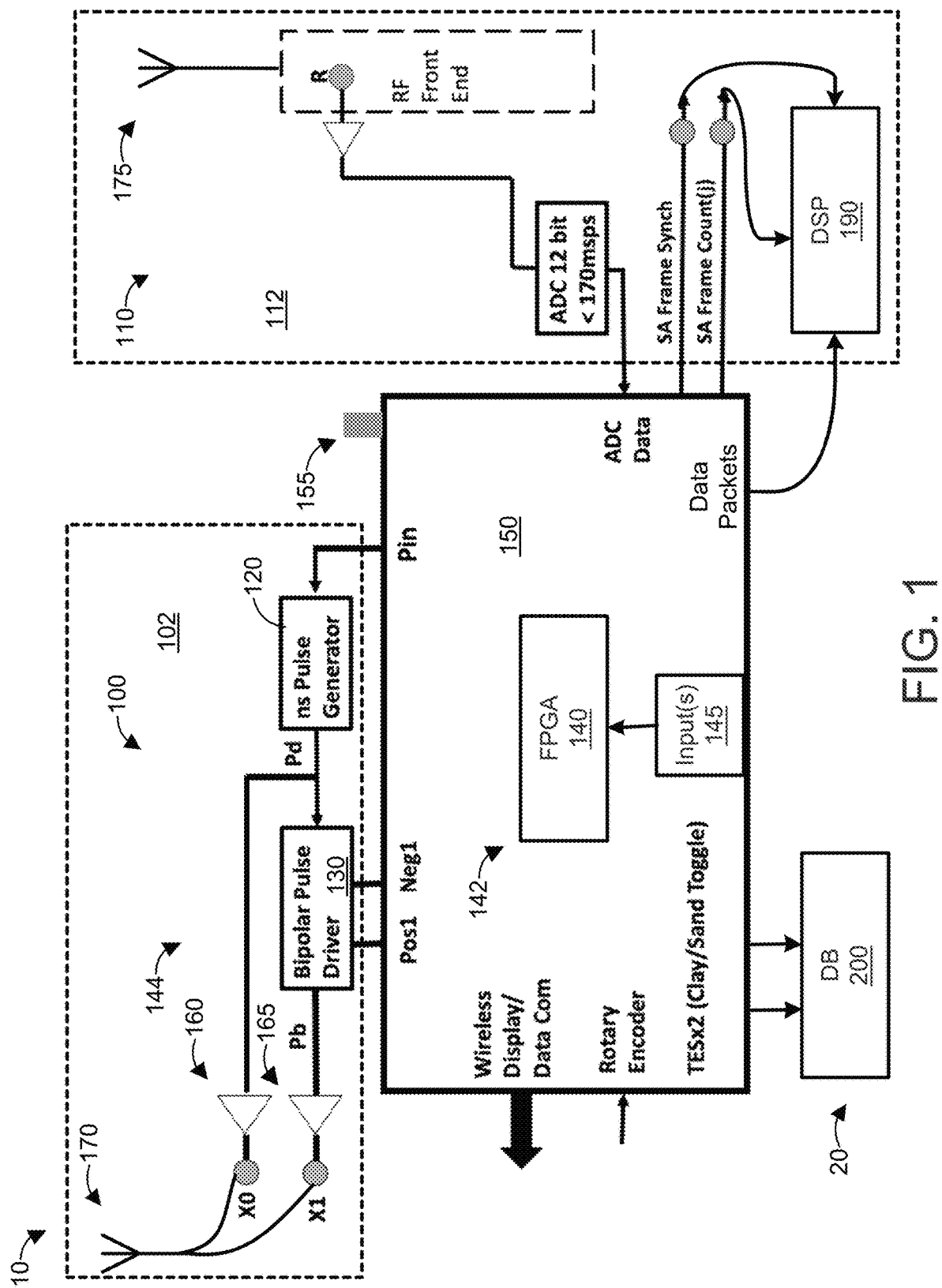
FIG. 1 is block diagram of a discrete-spectrum (DS) transceiver according to one or more embodiments.

FIG. 1 is block diagram of a DS transceiver 10 according to one or more embodiments. The DS transceiver 10 includes DS transmitters 100, 20 and a DS receiver 110. The DS transmitters 100, 20 and the DS receiver 110 can be disposed on optional daughterboards 102, 200, 112, respectively. The DS transmitter 100 includes a pulse generator 120 (e.g., a nanosecond pulse generator) and a bipolar pulse driver 130 that are electrically coupled to a field-programmable gate array (FPGA) 140 on a motherboard 150. The pulse generator 120 can comprise an electrical circuit, such an analog or a digital circuit, as known in the art.

The FPGA 140 can comprise a first circuit element 142 and the pulse generator 120 and/or the bipolar pulse driver 130 can comprise a second circuit element 144 in some embodiments. The structure and operation of the DS transmitter 20 is described in FIG. 2. In some embodiments, the DS transmitter 20 is optional.

In operation, the FPGA 140 simultaneously generates a plurality of DS signals having different respective discrete frequencies. The DS signal frequencies are related in that each DS signal frequency is (a) a harmonic of a fundamental frequency or (b) the fundamental frequency. In other words, the DS signal frequencies are a discrete Fourier series where each DS signal frequency can be represented as $nf_0$ where n is a positive integer and $f_0$ is the fundamental (or base) frequency. The DS signal frequencies can be generated based on one or more inputs 145, which can be provided via a user interface on a computer (e.g., a laptop, a desktop, a smartphone, or other computer) in electrical communication (e.g., via a wired or a wireless connection) with the motherboard 150. For example, the computer can include a mouse, a keyboard, and/or a display for entering and/or modifying the inputs 145. In addition or in the alternative, the inputs 145 can be generated by a microprocessor to transmit data, such as from a sensor, a probe, or other device.

The FPGA 140 also generates the appropriate DS signals and discrete frequencies for the DS transmitter 20. In some embodiments, the DS signals and discrete frequencies input to DS transmitter 20 are the same as the DS signals and discrete frequencies input to DS transmitter 100. In other embodiments, the DS signals and discrete frequencies input to DS transmitter 20 are the same as some of the DS signals and discrete frequencies input to DS transmitter 100. In another embodiment, some or all of the DS signals and discrete frequencies input to DS transmitter 20 are the different than the DS signals and discrete frequencies input to DS transmitter 100.

In some embodiments, the DS signal frequencies comprise or consist of a contiguous set of discrete Fourier series frequencies $nf_0$ that are transmitted simultaneously. For example, n can have a large range e.g., 1-100, 1-1,000, 1-10,000 or higher (e.g., approaching infinity). Alternatively, a fewer number of discrete Fourier series frequencies can be transmitted simultaneously (e.g., in parallel) to produce a mathematically-equivalent transmit construct as that associated with the summation of an infinite number of DS signal frequencies.

Data can be transmitted by modulating the amplitude of one or more of the DS signals as a function of time, for example based on one or more inputs 145 to the FPGA 140.

In some embodiments, multiple data signals can be transmitted simultaneously by modulating the amplitude of multiple DS signals (at different corresponding DS signal frequencies).

The pulse generator 120 and the bipolar pulse driver 130 can generate pulses having a frequency and/or irregular interval. The pulses are formed on the DS signals to indicate the beginning and/or end of a data transmission (or portion thereof), and/or to represent data. The pulse generator 120 has an input that is electrically coupled to an output Pin of the motherboard 150. The output of the pulse generator 120 is electrically coupled to a first input of the bipolar pulse driver 130 and to an input of a first RF amplifier 160. The output of the first RF amplifier 160 is electrically coupled to a transmitter antenna 170. The bipolar pulse driver 130 has positive and negative inputs that are electrically coupled to respective positive and negative outputs (Pos1, Neg1) of the motherboard 150, which are used to send driving signals to the bipolar pulse driver 130. The output of the bipolar pulse driver 130 is electrically coupled to an input of a second RF amplifier 165. The output of the second RF amplifier 165 is electrically coupled to the transmitter antenna 170.

The pulses generated by the pulse generator 120 can be different than the pulses generated by the bipolar pulse driver 130. For example, the pulses generated by the pulse generator 120 can have a different frequency, phase, and/or amplitude than the pulses generated by the bipolar pulse driver 130. Alternatively, the pulses generated by the pulse generator 120 can have the same frequency, phase, and/or amplitude as the pulses generated by the bipolar pulse driver 130. In some embodiments, some of the pulses generated by the pulse generator 120 can be the same as the pulses generated by the bipolar pulse driver 130, and some of the pulses generated by the pulse generator 120 can be different than the pulses generated by the bipolar pulse driver 130.

The pulses generated by the pulse generator 120 result in a first output signal Pd, which is output to the first RF amplifier 160 and to the bipolar pulse driver 130. The output of the first RF amplifier is output DS signal x0. The output of the bipolar pulse driver 130 is Pb, which is output to the second RF amplifier 165. The output of the second RF amplifier is DS signal x1, which can be the same or different than x0. In some embodiments, DS signals x0 and x1 have the same DS signal frequencies but have the same or different pulses layered on top. In other embodiments, the DS signals x0 and x1 can have one or more different DS signal frequencies.

In some embodiments, the pulse generator 120 controls (precisely controls in some embodiments) pulse formation duration (e.g., pulse length) for both the x0 and x1 outputs and the bipolar pulse drive 130 modulates the pulse polarity for the x1 output to ensure that the pulse shape is maintained when it is loaded by an external antenna, such as antenna 170.

In some embodiments, the pulses, generated by the pulse generator 120 and/or the bipolar pulse driver 130, of the DS signals (and DS signal frequencies) are a mathematically-equivalent transmit construct as that associated with the summation of an infinite number of DS signal frequencies.

The transmitter antenna 170 transmits the DS signals x0 and/or x1 over-the-air to a receiver. The DS signals x0 and/or x1 are a discrete Fourier series of frequencies that are transmitted simultaneously by the transmitter antenna 170. In some embodiments, the discrete Fourier series of frequencies are superimposed and/or summed with each other to form a single output signal.

The DS receiver 110 includes a receiver antenna 175, an RF front end 180, an analog-to-digital converter (ADC) 185, and a digital signal processor (DSP) 190. The output of the receiver antenna 175 is electrically coupled to the input of the RF front end 180. The output of the RF front end 180 is electrically coupled to the input of the ADC 185. The output of the ADC 185 is electrically coupled to an input of the motherboard 150. An output of the motherboard 150 is electrically coupled to an input of the DSP 190.

The motherboard 150 includes an optional switch 155 to change the operating mode of the DS transceiver 10. For example, the switch 155 can change the operating mode of the DS transceiver 10 between a first state in which the DS transceiver 10 uses the transmitters 100, 20 simultaneously to a second state in which the DS transceiver 10 transmitters 100, 20 separately. Additionally or alternatively, the switch 155 can select which transmitter 100, 20 to use for a given transmission. Though the switch 155 is illustrated as a physical switch, it is noted that the switch 155 can also be implemented as an electronic or a logical switch.

In operation, the receiver antenna 175 receives DS signals transmitted over-the-air from a DS transmitter, such as DS transmitter 100 or DS transmitter 20. The receiver antenna 175 passes the received signals to the RF front end 180, which outputs an analog representation of the received DS signals. The analog representation of the received DS signals is then passed through the ADC 185 that converts the analog representation into a digital representation of the received DS signals (ADC Data in FIG. 1). The digital representation can include header and data packets. In the motherboard 150, the FPGA 140 performs detection processing to remove the header packets from the ADC Data, leaving only the data packets. The data packets are raw digital data that correspond to the DS signals received at the receiver antenna 175. These data packets are then sent from the motherboard 150 to the DSP 190 over a wired communication line. The DSP 190 performs a fast Fourier transform (FFT) of the data packets to transform their representation from the signal domain into the frequency domain. The FFT of the data packets reveals the DS signal frequencies over which the DS signals were transmitted and their relative amplitudes. A variation in the relative amplitude of one or more of the DS signal frequencies over time can correspond to a data signal (e.g., a bit).

In some embodiments, the DSP 190 is located on the motherboard 150 or on another daughterboard. In other embodiments, the DSP 190 and the FPGA 140 are integrated as a single structure on the motherboard 150.

All frame-related timing and synchronization can be managed by the same FPGA counters that are used to synthesize the integer-frequency DS signals.

Unlike conventional receivers that are limited by the Nyquist sampling rate (twice the transmit bandwidth), the DS receiver 110—due to the transmission of a Fourier series of DS frequencies $nf_0$—is only limited by the ADC conversion rate (and not by the Nyquist sampling rate). Thus, the DS receiver 110 has a bandwidth that is twice that of conventional receivers.

Another advantage of transmitting multiple DS frequencies simultaneously compared with using continuous analog signals is the fundamental property that the DS frequencies are orthogonal to each other, which results in zero cross-correlation between the transmitted DS frequencies or no interference with neighboring frequency bands (e.g., licensed or government frequency bands).

Figure 2:
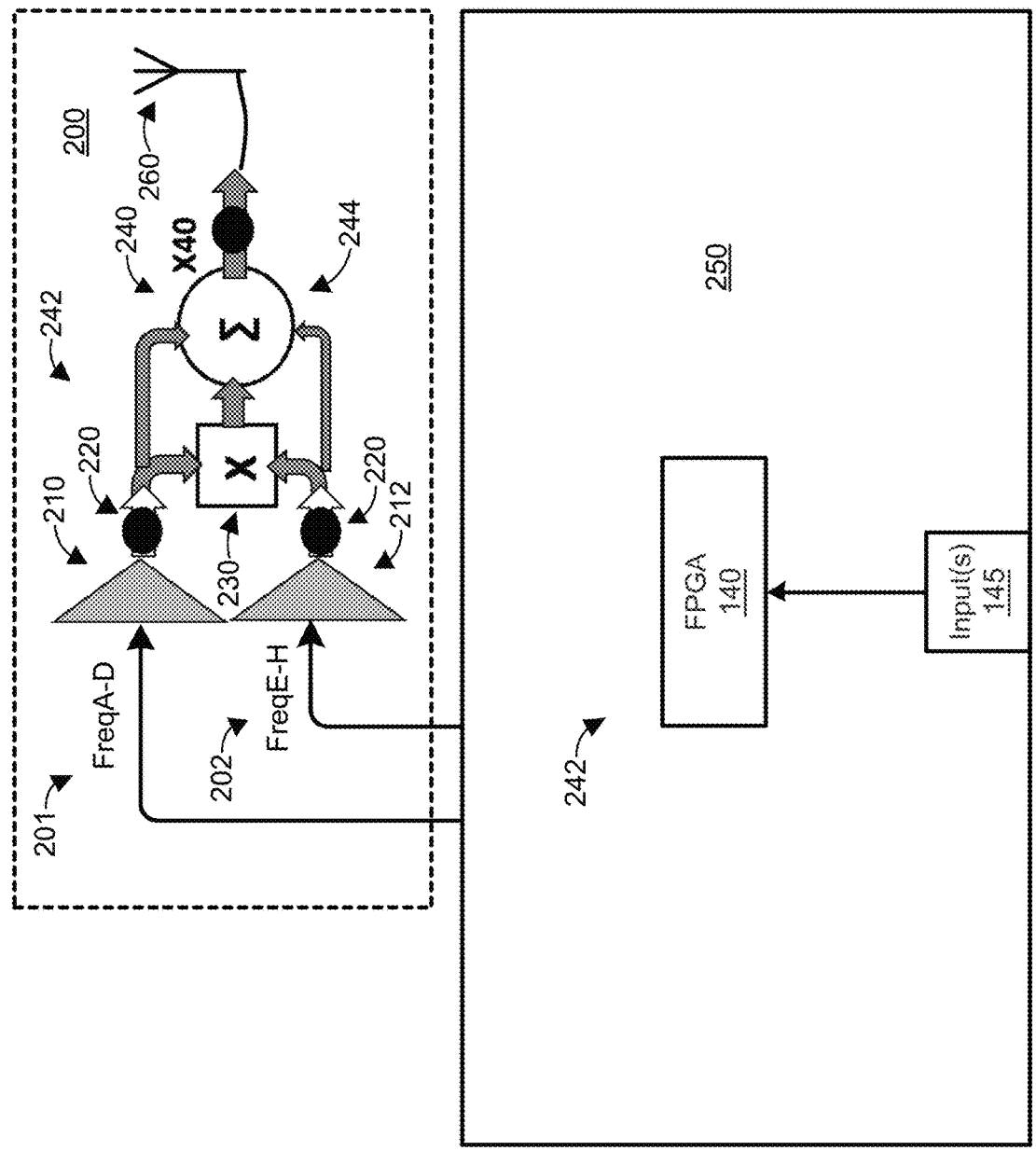
FIGS. 2 and 3 are block diagrams of a DS transmitter according to one or more embodiments.

FIG. 2 is block diagram of a DS transmitter 20 according to one or more embodiments. The transmitter 20 includes a motherboard 250 and daughterboard 200. The motherboard 250 includes an FPGA 140 that is electrically coupled to input(s) 145, as discussed above. The motherboard 250 can be the same as motherboard 150. The daughterboard 200 includes two RF amplifiers 210, 212, optional buffers 220, an RF mixer 230, an RF summing amplifier 240, and a transmitter antenna 260. The components of the daughterboard 200 are not illustrated in FIG. 1 solely for purposes of illustration.

In some embodiments, the FPGA 140, the RF amplifiers 210, 212, the optional buffers 220, and the RF mixer 230 can comprise a first circuit element 242 and the RF summing amplifier 240 can comprise a second circuit element 244.

In operation, the FPGA 140 generates DS signals having different DS signal frequencies determined by the relationship $nf_0$, as discussed above. A first group 201 of DS signals is input to the first RF amplifier 210. A second group 202 of DS signals is input to the second RF amplifier 212. The first and second groups 201, 202 of DS signals can have the same or a different number of DS signal frequencies. In the example illustrated in FIG. 2, the first and second groups 201, 202 of DS signals each have 4 DS signal frequencies. Specifically, the first group 201 of DS signals has DS signal frequencies A-D, and the second group 202 of DS signals has DS signal frequencies E-H.

After passing through the respective RF amplifiers 210, 212 and optional buffers 220, the first and second groups 201, 202 of DS signals are transmitted to the RF mixer 230 and to the RF summing amplifier 240. The output of the RF mixer is the sum and difference of the respective DS signal frequencies in each group 201, 202 of DS signals. For example, the output of the RF mixer includes the following frequency sums: DS signal frequency A+E, DS signal frequency A+F, DS signal frequency A+G, and DS signal frequency A+H. The output of the RF mixer also includes the following frequency differences: DS signal frequency E-A, DS signal frequency F-A, DS signal frequency G-A, and DS signal frequency H-A (where DS signal frequency A is less than each of DS signal frequencies E-H). When the frequency difference is negative, the output of the RF mixer is phase-shifted by 180 degrees. It is noted that since each DS signal frequency in the first and second groups 201, 202 of DS signals can be represented as $nf_0$, the sum and difference of the respective frequencies can also be represented as $nf_0$.

The output of the RF mixer 230 is summarized in Table 1.

TABLE 1

| RF mixer inputs | Freq. E | Freq. F | Freq. G | Freq. H |
|---|---|---|---|---|
| Freq. A | Sum: A + E<br>Dif: E − A | Sum: A + F<br>Dif: F − A | Sum: A + G<br>Dif: G − A | Sum: A + H<br>Dif: H − A |
| Freq. B | Sum: B + E<br>Dif: E − B | Sum: B + F<br>Dif: F − B | Sum: B + G<br>Dif: G − B | Sum: B + H<br>Dif: H − B |
| Freq. C | Sum: C + E<br>Dif: E − C | Sum: C + F<br>Dif: F − C | Sum: C + G<br>Dif: G − C | Sum: C + H<br>Dif: H − C |
| Freq. D | Sum: D + E<br>Dif: E − D | Sum: D + F<br>Dif: F − D | Sum: D + G<br>Dif: G − D | Sum: D + H<br>Dif: H − D |

As illustrated in Table 1, the RF mixer 230 outputs 32 DS signals (having 32 DS signal frequencies) when the first and second groups 201, 202 of DS signals each include 4 DS signals (4 DS signal frequencies). The output of the RF mixer 230 serves an input to the RF summing amplifier 240, in addition to the first and second groups 201, 202 of DS signals.

The output of the RF summing amplifier 240 includes the sum of each of the DS signal inputs. The transmitter antenna 260 receives the DS signals output from the RF summing amplifier 240 and broadcasts them simultaneously, as a summed signal, over-the-air. Thus, the output of the RF summing amplifier 240 includes 40 DS signals: (a) the first group 201 of DS signals (having DS signal frequencies A-D), (b) the second group 202 of DS signals (having DS signal frequencies E-H), and (c) the DS signals output from the RF mixer 230 (having the 32 DS signal frequencies illustrated in Table 1). Additional or fewer DS signals can be output by the RF mixer 230 by increasing or decreasing, respectively, the number of signals input to the first and second RF amplifiers 210, 220.

In some embodiments, the DS transmitter 20 can be configured as a DS transceiver. For example, the DS transmitter 20 can include the DS receiver 110 of DS transceiver 10.

Figure 3:
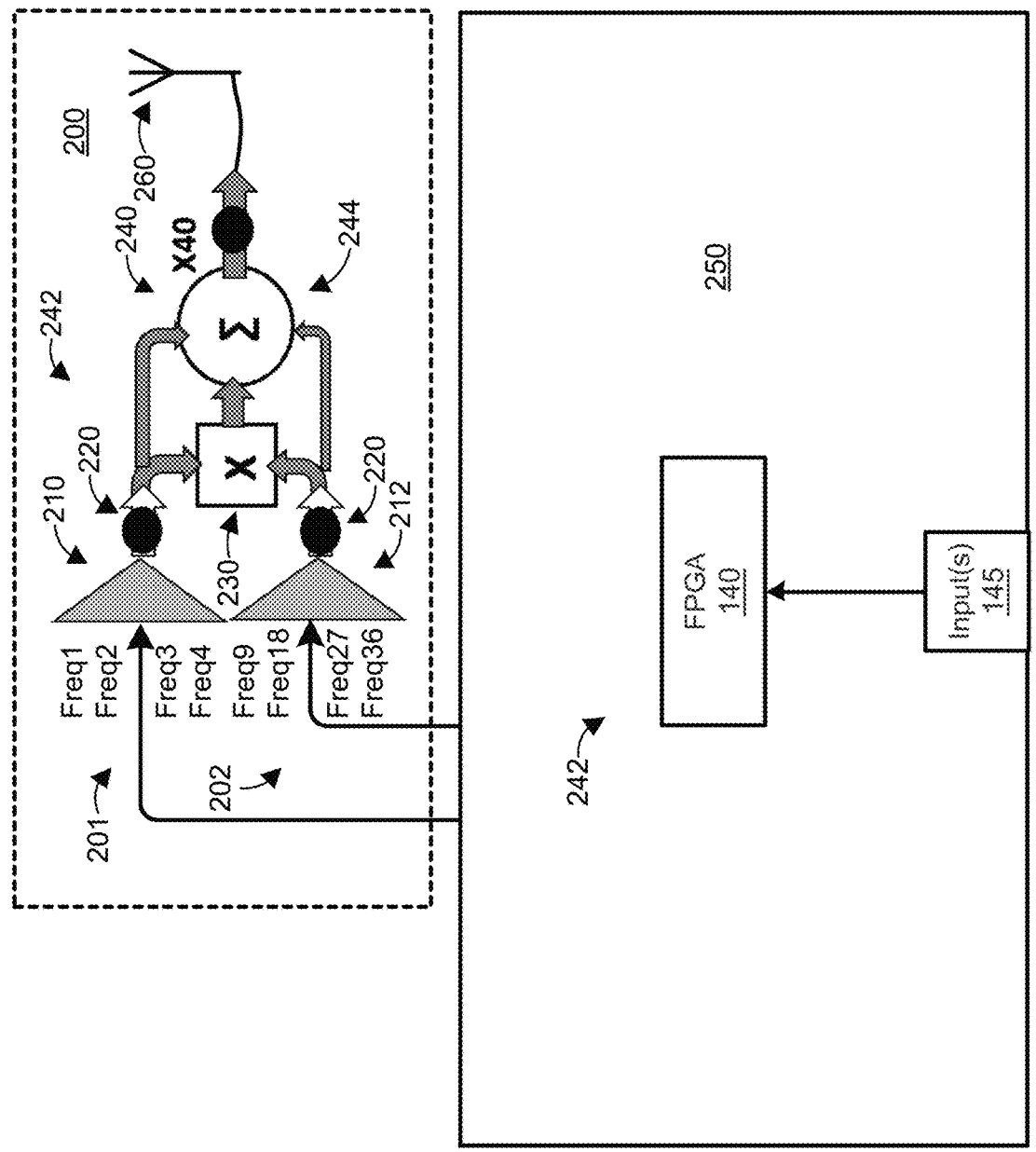

In one embodiment, the DS signal frequencies of the first and second groups 201, 202 of DS signals are selected so the output of the RF summing amplifier 240 has 40 consecutive DS signal frequencies. In other words, the output of the RF summing amplifier 240 can include a consecutive set of frequencies represented as $nf_0$ where n=1-40. In this embodiment, the first group 201 of DS signals has frequencies 1-4 (i.e., n=1-4) and the second group 202 of DS signals has frequencies 9, 18, 27, and 36 (i.e., n=9, 18, 27, 36), as illustrated in FIG. 3. The output of the RF mixer 230 is provided in Table 2.

TABLE 2

| RF mixer inputs | Freq. 9 | Freq. 18 | Freq. 27 | Freq. 36 |
| --- | --- | --- | --- | --- |
| Freq. 1 | Sum: 10<br>Dif: 8 | Sum: 19<br>Dif: 17 | Sum: 28<br>Dif: 26 | Sum: 37<br>Dif: 35 |
| Freq. 2 | Sum: 11<br>Dif: 7 | Sum: 20<br>Dif: 16 | Sum: 29<br>Dif: 25 | Sum: 38<br>Dif: 34 |
| Freq. 3 | Sum: 12<br>Dif: 6 | Sum: 21<br>Dif: 15 | Sum: 30<br>Dif: 24 | Sum: 39<br>Dif: 33 |
| Freq. 4 | Sum: 13<br>Dif: 5 | Sum: 22<br>Dif: 14 | Sum: 31<br>Dif: 23 | Sum: 40<br>Dif: 32 |

As illustrated in Table 1, the RF mixer 230 outputs the following DS signal frequencies: 5-8, 10-17, 19-26, 28-35, and 37-40 (i.e., n=5-8, 10-17, 19-26, 28-35, and 37-40).

The inputs to the RF summing amplifier 240 are: (a) the first group 201 of DS signals (having DS signal frequencies 1-4), (b) frequencies 9, 18, 27, and 36, the second group 202 of DS signals (having DS signal frequencies 9, 18, 27, and 36), and (c) the DS signals output from the RF mixer 230 (having DS signal frequencies: 5-8, 10-17, 19-26, 28-35, and 37-40 as illustrated in Table 2). Thus, RF summing amplifier 240 outputs DS signals having a contiguous set of DS frequencies 1-40 ($1 \leq n \leq 40$ ($f_0$ to $40f_0$)).

In another example, the frequencies of the first and second groups 201, 202 of DS signals can be selected so that the RF summing amplifier 240 outputs DS signals having a discontinuous set of DS frequencies where at least two of the discrete Fourier series frequencies are not contiguous. An example of an output of the RF summing amplifier 240 that includes a fully-discontinuous set of discrete Fourier series frequencies is n=1, 3, 8, 10, 15, 25, 73, 90, and 102. An example of a partially-discontinuous set of discrete Fourier series frequencies is n=1-5, 50-60, and 100-115. For example, when the first group 201 of DS signals frequencies 1-4 and the second group 202 of DS signals has frequencies 9, 18, and 36, the DS signals output by the RF summing amplifier 240 have the following partially-discontinuous set of discrete Fourier series frequencies: 1-22 and 32-40 according to Table 2.

As can be seen, the discrete Fourier series frequencies are generally within a relatively narrow frequency range in the contiguous set of discrete Fourier series frequencies (e.g., in the frequency range of $f_0$ to $40f_0$). However, the discontinuous set of discrete Fourier series frequencies can either be within a relatively narrow frequency range (e.g., where n=1, 3, 8, 10 and 15) or distributed over a relatively wide frequency range (e.g., where n=1, 8, 100, 513, 917, and 1301).

For some applications, it may be advantageous for the DS signal frequencies to be within a relatively narrow frequency range. For example, a relatively narrow frequency range (e.g., 700 MHz to 5.4 GHz) can be transmitted and received using a low-cost ceramic chip antenna. Additionally, a narrow frequency range may be useful for certain applications, such as determining a feature size (e.g., in human anatomy, in the ground, etc.). For some applications, it can be advantageous for the DS signal frequencies to be discontinuous to reduce the detectability and increase security of the transmission. Additionally, the discontinuous set of discrete Fourier series frequencies can include multiple frequency ranges of interest, such as unlicensed frequency bands.

Figure 4:
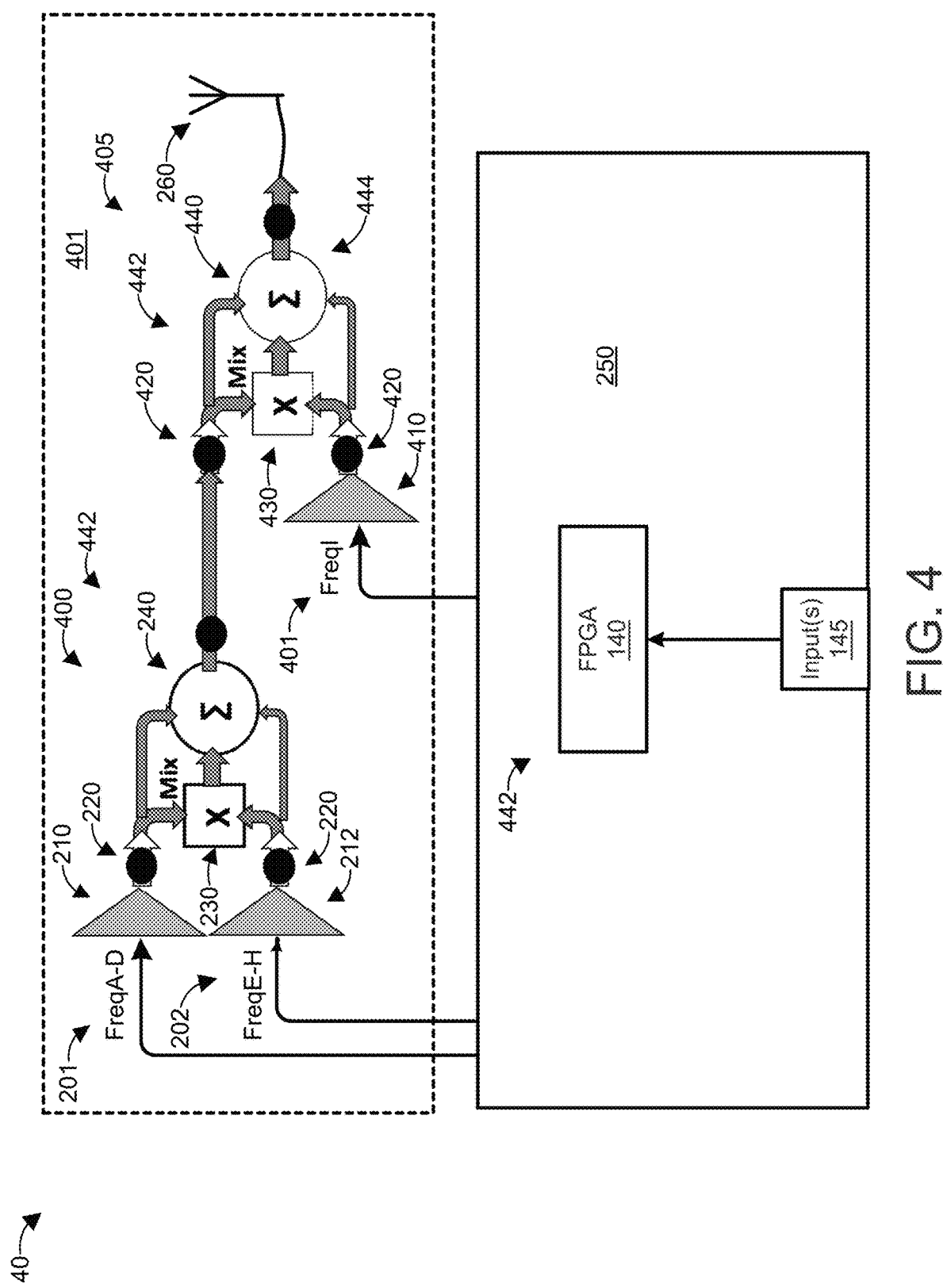
FIGS. 4 and 5 are block diagrams of a DS transmitter according to an alternative embodiment.

FIG. 4 is block diagram of a DS transmitter 40 according to an alternative embodiment. The DS transmitter 40 is the same as DS transmitter 20 except that the DS transmitter 40 includes two stages 400, 405 of DS signal frequency mixing and summing while the DS transmitter 20 only includes one stage. The first stage 400 includes the same RF amplifiers 210, 212, optional buffers 220, RF mixer 230, and RF summing amplifier 240 as DS transmitter 20. The second stage 405 includes an RF amplifier 410, optional buffers 420, an RF mixer 430, and an RF summing amplifier 440. The first and second stages 400, 405 are disposed on a daughterboard 401. Alternatively, each stage 400, 405 can be disposed on a different daughterboard.

The output of the RF summing amplifier 240 in the first stage 400 is input to the RF mixer 430 in the second stage 405. As discussed above, when the first and second groups 201, 202 of DS signals each include 4 DS signals, the output of the RF summing amplifier 240 is 40 DS signals (having respective DS signal frequencies). The other input to the RF mixer 430 is the output of the RF amplifier 410 and corresponding optional buffer 420. The input 401 to the RF amplifier 410 is a DS signal having a DS signal frequency I, which can be represented as $nf_0$. In other embodiments, the input 401 includes multiple DS signals having respective DS signal frequencies ($nf_0$).

The output of the RF mixer 430 is the sum and difference of the respective DS signal frequencies in each input to the RF mixer 430. That is, the output of the RF mixer 430 is the sum and difference of (a) the DS signals output from the first stage 400 and (b) the DS signal(s) provided at input 401. When there are 40 DS signals output from the first stage 400 (e.g., as illustrated in and described with respect to FIGS. 2 and 3), there will be 80 DS signals output by the RF mixer 430. These 80 DS signals include 40 "sums" and 40 "differences" when the input 401 only includes 1 DS signal.

The inputs to the RF summing amplifier 440 are (a) the output from the RF mixer 430 (e.g., the 80 DS signals described above), (b) the output from the first stage 400 (e.g., the 40 DS signals described above), and (c) the DS signal provided at input 401. The output of the RF summing amplifier 440 includes each of the DS signal inputs. Therefore, in the configuration illustrated in FIG. 4, the output of the RF summing amplifier has 121 DS signals, which are transmitted simultaneously, as a summed signal, over-the-air using the transmitter antenna 260.

In some embodiments, the DS transmitter 40 can be configured as a DS transceiver. For example, the DS transmitter 40 can include the DS receiver 110 of DS transceiver 10.

In some embodiments, the FPGA 140, the RF amplifiers 210, 212, optional buffers 220, RF mixer 230, RF summing amplifier 240, optional buffers 420, and RF mixer 430 can comprise a first circuit element 442 and the RF summing amplifier 440 can comprise a second circuit element 444.

Figure 5:
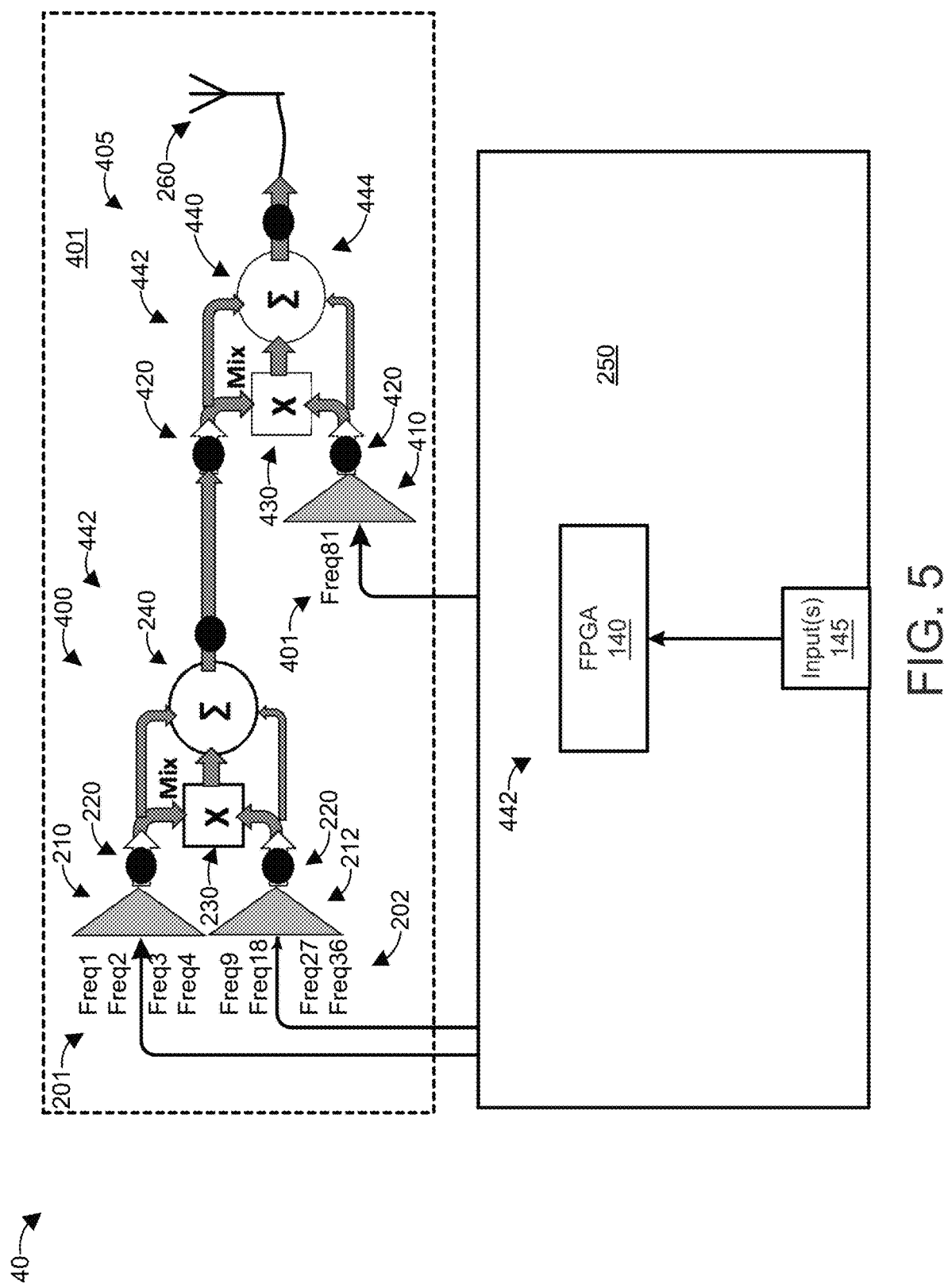

In one embodiment, the DS signal frequencies of the first and second groups 201, 202 of the first stage 400 and the input 401 of the second stage 410 can be selected so the output of the RF summing amplifier 440 has 121 consecutive DS signal frequencies, for example as illustrated in FIG. 5. In other words, the output of the RF summing amplifier 440 can include a contiguous set of frequencies represented as $nf_0$ where n=1-121. In this embodiment, the first group 201 of DS signals has frequencies 1-4 (i.e., n=1-4) and the second group 202 of DS signals has frequencies 9, 18, 27, and 36 (i.e., n=9, 18, 27, 36). The input 401 of the second stage 410 has frequency 81 (i.e., n=81).

In other embodiments, the output of the RF summing amplifier 440 serves an input to a third stage that is identical to second stage 410. The input to the RF amplifier in the third stage can include one or more DS signals, and function as discussed above with respect to the second stage 410. Additional stages can be provided thereafter, as desired.

FIG. 6A is a plot 60 of pulses of 40 contiguous DS signal frequencies (n=1-40) when $f_0$ is 6.94 MHz. The plot 60 represents the 40 contiguous DS signal frequencies that can be transmitted simultaneously using DS transmitter 20 in the configuration of FIG. 3. FIG. 6B is an FFT 62 of plot 60. As can be seen in the FFT 62, each frequency has a relative amplitude of 1.

Figure 7A:
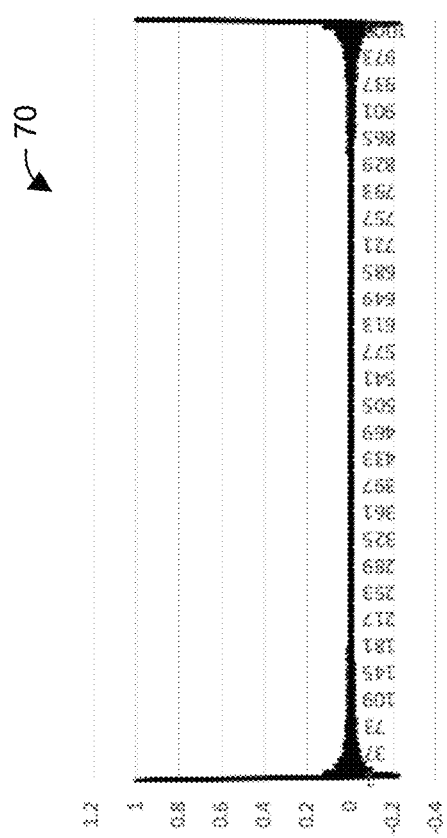
FIG. 7A is a plot of pulses of 121 contiguous DS signal frequencies in the time or signal domain.
Figure 7B:
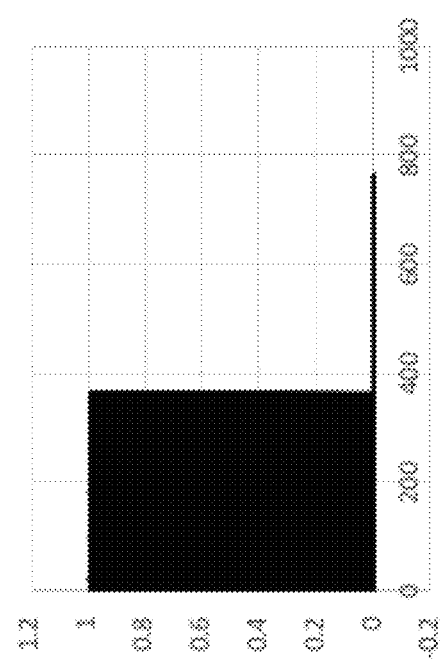
FIG. 7B is a plot of pulses of 121 contiguous DS signal frequencies in the frequency domain.

FIG. 7A is a plot 70 of pulses of 121 contiguous DS signal frequencies (n=1-121) when $f_0$ is 6.94 MHz. The plot 70 represents the 121 contiguous DS signal frequencies that can be transmitted simultaneously using DS transmitter 40 in the configuration of FIG. 5. FIG. 7B is an FFT 72 of plot 70. As can be seen in the FFT 72, each frequency has a relative amplitude of 1. By comparing plots 60 and 70, it can be seen that plot 60 has a longer settling time than plot 70, which may be relevant for certain applications.

Figure 8:
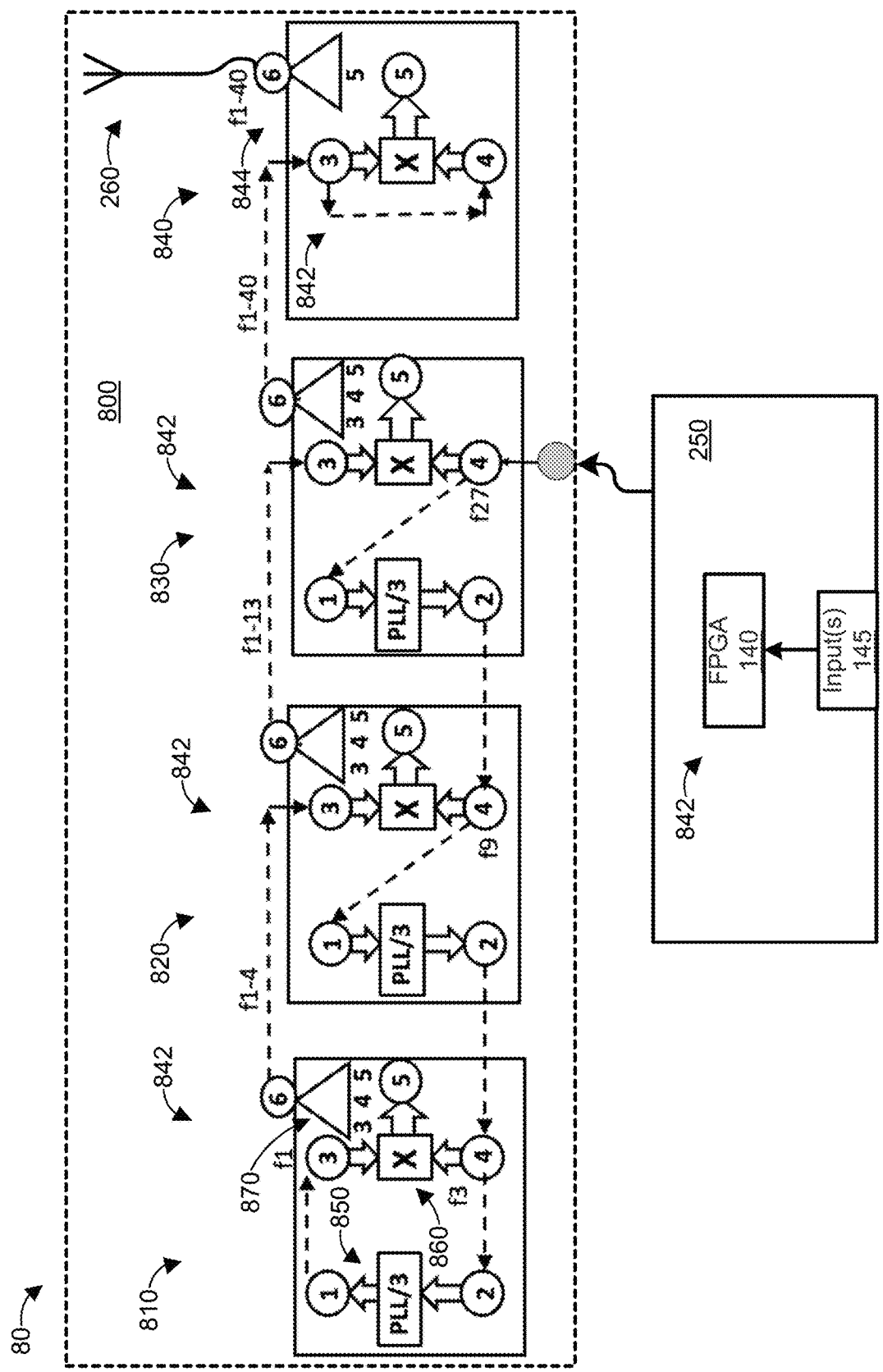
FIG. 8 is a block diagram of a DS transmitter according to one or more embodiments.

FIG. 8 is a block diagram of a DS signal transmitter 80 according to one or more embodiments. The transmitter 80 includes a first stage 810, a second stage 820, a third stage 830, and an optional termination stage 840. The DS transmitter 80 outputs DS signals having a contiguous set of 40 DS frequencies (n=1-40). Additional stages can be included prior to the termination stage, such as between the third stage 830 and the termination stage 840, to increase the number of DS signals (and DS signal frequencies) output by the DS transmitter 80.

Each stage includes a frequency divider 850 (e.g., in a phased-locked loop), an RF mixer 860, and an RF summing amplifier 870. In addition, each stage includes 6 reference points labeled 1-6 in FIG. 8. The frequency divider 850 can be a phased lock loop or a divide-by-three frequency generator (e.g., the ADF4154 (4 GHz) or the ADF4107 (7 GHz) available from Analog Devices, Inc.). Examples of the RF mixer 860 and other RF mixers described herein include the LT5500 (4 GHz) and the LTC5548 (14 GHz) available from Analog Devices, Inc. Examples of the RF summing amplifier 870 and other RF summing amplifiers described herein include the SGL0622Z (4 GHz) and the NLB310 (10 GHz) available from Quorvo, Inc. These components are low cost (e.g., less than $10).

In some embodiments, the FPGA 140 and the electrical components of each stage 810, 820, 830, 840 except for the RF summing amplifier 870 that is electrically coupled to the antenna 260 (e.g., the RF summing amplifier 870 in the optional termination stage 840 when that stage is present, or the RF summing amplifier 870 in the third stage 830 when the optional termination stage 840 is not present) can comprise a first circuit element 842. The RF summing amplifier 870 is electrically coupled to the antenna 260 can comprise a second circuit element 844.

In operation, a reference DS signal is provided from the FPGA 140 as an input to the third stage 840 at reference point 4. Alternatively, the DS signal can be provided by a frequency generator, such as the ADF4154 (4 GHz) or the ADF4107 (7 GHz). The DS signal input to the third stage 840 has a DS signal frequency that represents the 27th harmonic ($27f_0$ or n=27) of the fundamental frequency in the contiguous discrete frequency band output by the DS transmitter 80. The DS signal f27 is provided as an input to the RF mixer 860 and to the frequency divider 850 in the third stage 830. The frequency divider 850 divides the input frequency by 3 to provide an output of $9f_0$ of $f_9$ at reference point 2 in the third stage 830, which is then provided to reference point 4 in the second stage 820. In the second stage, $f_9$ is provided as an input to the RF mixer 860 and to the frequency divider 850. The frequency divider 850 divides the input frequency by 3 to provide an output of $3f_0$ or $f_3$ at reference point 2 in the second stage 820, which is then provided to reference point 4 in the first stage 810. In the first stage 810, $f_3$ is provided as an input to the RF mixer 860 and to the frequency divider 850. The frequency divider 850 divides the input frequency by 3 to provide an output of $f_0$ or $f_1$ at reference point 2 in the first stage 810, which is then provided to reference point 3.

Continuing in the first stage 810, the signals at reference points 3 and 4 ($f_1$ and $f_3$, respectively) are input to the RF mixer 860, which outputs the sum and difference of these signals ($f_4$ and $f_2$, respectively) at reference point 5. The signals at reference points 3-5 are then provided as inputs to the RF summing amplifier 870 in the first stage 510, which outputs a summation of the input signals at reference point 6. Thus, reference point 6 in the first stage 510 corresponds to $f_{1-4}$.

The signals $f_{1-4}$ at reference point 6 in the first stage 810 are provided to reference point 3 in the second stage 820. The signals at reference points 3 and 4 ($f_{1-4}$ and $f_9$, respectively) are input to the RF mixer 860 in the second stage 820, which outputs the sum and difference of these signals ($f_{5-8}$ and $f_{10-13}$, respectively) at reference point 5. The signals at reference points 3-5 are then provided as inputs to the RF summing amplifier 870 in the second stage 820, which outputs a summation of the input signals at reference point 6. Thus, reference point 6 in the second stage 820 corresponds to $f_{1-13}$.

The signals $f_{1-13}$ at reference point 6 in the second stage 820 are provided to reference point 3 in the third stage 830. The signals at reference points 3 and 4 ($f_{1-13}$ and $f_{27}$, respectively) are input to the RF mixer 860 in the third stage 830, which outputs the sum and difference of these signals ($f_{28-40}$ and $f_{14-26}$, respectively) at reference point 5. The signals at reference points 3-5 are then provided as inputs to the RF summing amplifier 870 in the third stage 830, which outputs a summation of the input signals at reference point 6. Thus, reference point 6 in the third stage 830 corresponds to $f_{1-40}$, a contiguous set of discrete Fourier series frequencies.

The signals $f_{1-40}$ at reference point 6 in the third stage 520 can be provided to reference points 3 and 4 in the optional termination stage 840. The signals $f_{1-40}$ at reference points 3 and 4 are input to the RF mixer 860 in the optional termination stage 840, which outputs at reference point 5 the sum and difference of these signals as $f_{1-40}$. The signals $f_{1-40}$ at reference point 5 are input to the RF summing amplifier 870 in the optional termination stage 840. The output of the RF summing amplifier 870 is electrically coupled to a transmitter antenna 260, which transmits a DS output signal having the signal frequencies $f_1$-$f_{40}$ summed or superimposed thereon. Thus, the signals frequencies $f_1$-$f_{40}$ are transmitted simultaneously.

As discussed above, the DS transmitter 80 can include a fourth stage between the third stage 830 and the optional termination stage 840. The fourth stage is identical (or substantially identical) to any of the first, second, and third stages 810, 820, 830 except that the fourth stage would receive the input DS signal (e.g., from FPGA 140) as an input at reference point 4. In this embodiment, the input DS signal can represent the 51st harmonic ($51f_0$ or n=51) of the fundamental tone/frequency in the contiguous discrete frequency output by the DS transmitter 80. When the DS transmitter 80 includes such a fourth stage, the DS signal illustrated in FIG. 8 (representing the 27th harmonic) is not input to the third stage 830. Instead, the signal $f_{27}$ is generated by the frequency divider in the fourth stage ($f_{51}$ divided by 3). Including a fourth stage provides the DS transmitter 80 with a contiguous DS frequency output of $f_{1-121}$. Adding a fifth stage—with an input DS signal representing the 153rd harmonic as an input to reference point 4 in the fifth stage—can provide the DS transmitter 80 with a contiguous DS frequency output of $f_{1-364}$. In this example, the transmitter antenna 260 transmits a DS output signal having the signal frequencies $f_1$-$f_{121}$ summed or superimposed thereon. Thus, the signals frequencies $f_1$-$f_{121}$ are transmitted simultaneously.

In general, the last stage (i.e., immediately prior to the optional termination stage 840) receives the input DS signal. The frequency of the input DS signal can determined by the following equation: $f_{input}=3^n \times f_0$ where n equals the total number of stages (not including termination stage 840).

The stages illustrated in FIG. 8 can be provided on a common daughterboard 800. Alternatively, the stages can be provided on two or more daughterboards, which can allow the number of stages to be increased or decreased modularly.

In some embodiments, the configuration of FIG. 8 serves as a first cascaded stage in a cascaded configuration where the output of the first cascaded stage (e.g., at reference point 6 in the third stage 830 or in the termination stage 840) serves as an input to a second cascaded stage, which can be the same or different than the first cascaded stage. The reference DS signal frequency(ies) for the second cascaded stage (and any subsequent cascaded stage) has the effect of either a) generating a contiguous series of DS signal frequencies or b) generating a new discontinuous series of DS signal frequencies in different frequency bands available for multiple unrelated applications.

Figure 9:
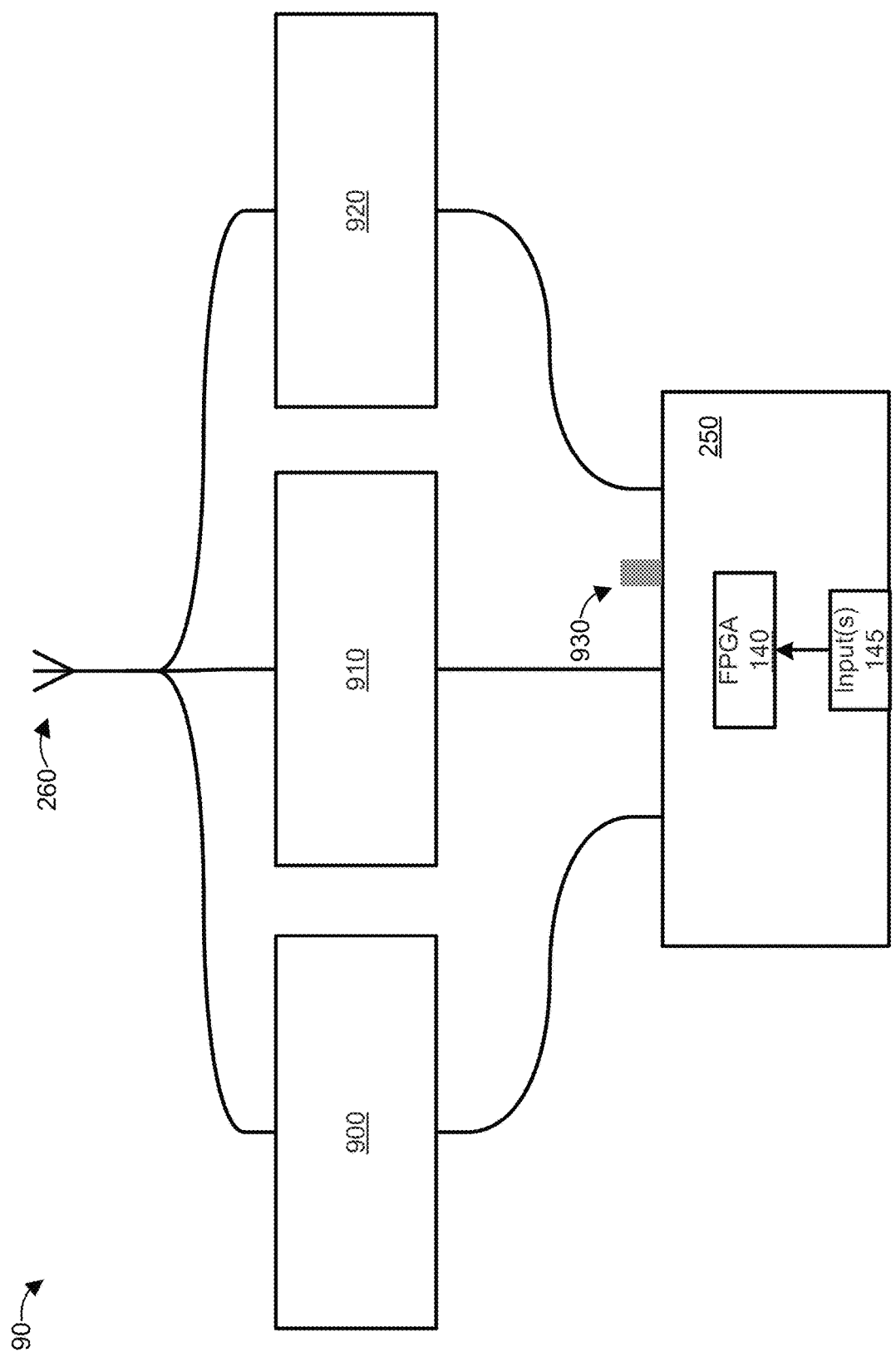
FIG. 9 is a block diagram of a DS transmitter according to an alternative embodiment.

FIG. 9 is a block diagram of a DS transmitter 90 according to an alternative embodiment. The DS transmitter 90 includes a motherboard 250 and daughterboards 900, 910, 920. Daughterboard 900 is the same as daughterboard 100. Daughterboard 910 is the same as daughterboard same as 200 or daughterboard 401. Daughterboard 920 is the same as 800. Thus, each daughterboard 900, 910, 920 has a different configuration. In other embodiments, two or more of the daughterboards 900, 910, 920 can have the same configuration.

The DS transceiver 90 can transmit DS signals using the daughterboards 900, 910, 920 (or a subset thereof) simultaneously (e.g., in parallel) or separately (e.g., in series). The motherboard 250 can include a switch 930 to change the operating mode of the DS transmitter 90. For example, the switch 930 can change the operating mode of the DS transmitter 90 using the daughterboards 900, 910, 920 simultaneously to using them individually. Additionally or alternatively, the switch 930 can select which daughterboard 900, 910, 920 to use for a given transmission. Though the switch 930 is illustrated as a physical switch, it is noted that the switch 930 can also be implemented as an electronic or a logical switch.

The FPGA 140 can generate the number of DS signals and the appropriate DS signal frequency(ies) for each daughterboard 900, 910, 920 in use for a given transmission. The number of DS signals and the DS signal frequency(ies) can be determined based on the inputs 145.

Each daughterboard 900, 910, 920 can have an internal transmitter antenna. Alternatively, the daughterboards 900, 910, 920 can be electrically coupled to a common external transmitter antenna 260. In other embodiments, each daughterboard 900, 910, 920 is electrically coupled to its own external transmitter antenna, which can be the same as common external transmitter antenna 260.

In some embodiments, the DS transmitter 90 only includes two daughterboards. For example, the DS transmitter 90 can only include daughterboards 900 and 910. In another example, the DS transmitter 90 can only include daughterboards 900 and 920. In another example, the DS transmitter 90 can only include daughterboards 910 and 920. In other embodiments, the DS transmitter 90 includes more than three daughterboards.

Figure 10:
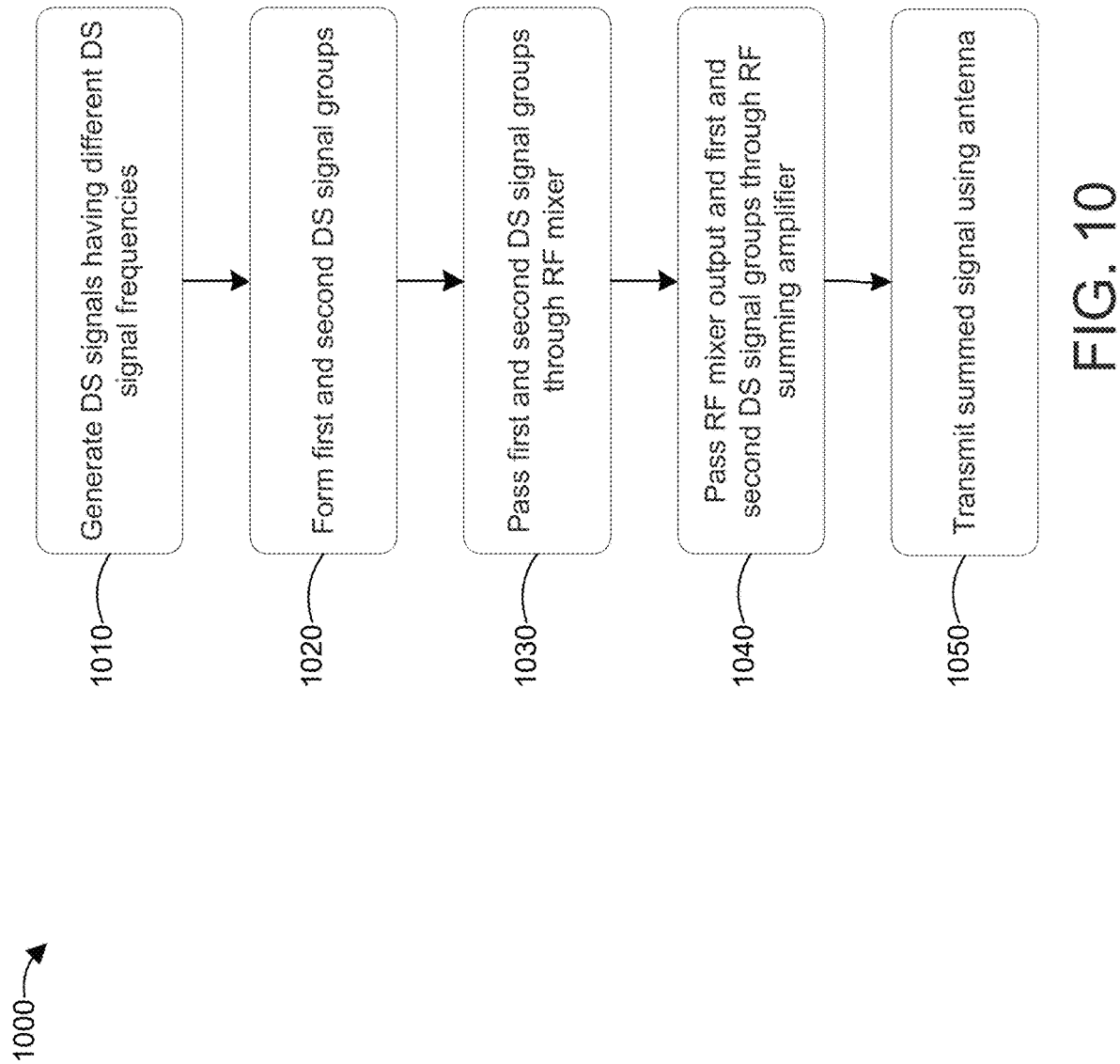
FIG. 10 is a flow chart of a method for transmitting DS signals according to one or more embodiments.

FIG. 10 is a flow chart 1000 of a method for transmitting DS signals according to one or more embodiments. The method can be performed using DS transmitter 20. In step 1010, DS signals having different DS signal frequencies are generated. The DS signal frequencies can be represented as $nf_0$, as discussed above. The DS signals can be generated using an FPGA (e.g., FPGA 140), an arbitrary waveform generator, or another device. In one example, 4-12 DS signals are generated in step 1010. The number and frequency of the DS signals can be generated based on one or more inputs.

In step 1020, first and second DS signal groups are formed. Each DS signal group includes a subset of the DS signals formed in step 1010. The composition of each DS signal group can be based on one or more inputs.

In step 1030, the first and second DS signal groups are passed through an RF mixer (e.g., RF mixer 230). The RF mixer outputs the sum and difference of the DS signal frequencies of each DS signal in the respective DS signal group. Additional details of the RF mixer are described above with respect to FIGS. 2 and 3. In some embodiments, the first and second DS signal groups are passed through respective RF amplifiers (e.g., RF amplifiers 210, 212) and buffers (e.g., buffers 220) before they are passed through the RF mixer.

In step 1040, the RF mixer output and the first and second DS signal groups are passed through an RF summing amplifier (e.g., RF summing amplifier 240). The RF summing amplifier outputs a signal having each DS signal frequency of each input superimposed thereon.

In step 1050, the summed signal output from the RF summing amplifier (step 1040) is transmitted over-the-air using an antenna.

Figure 11:
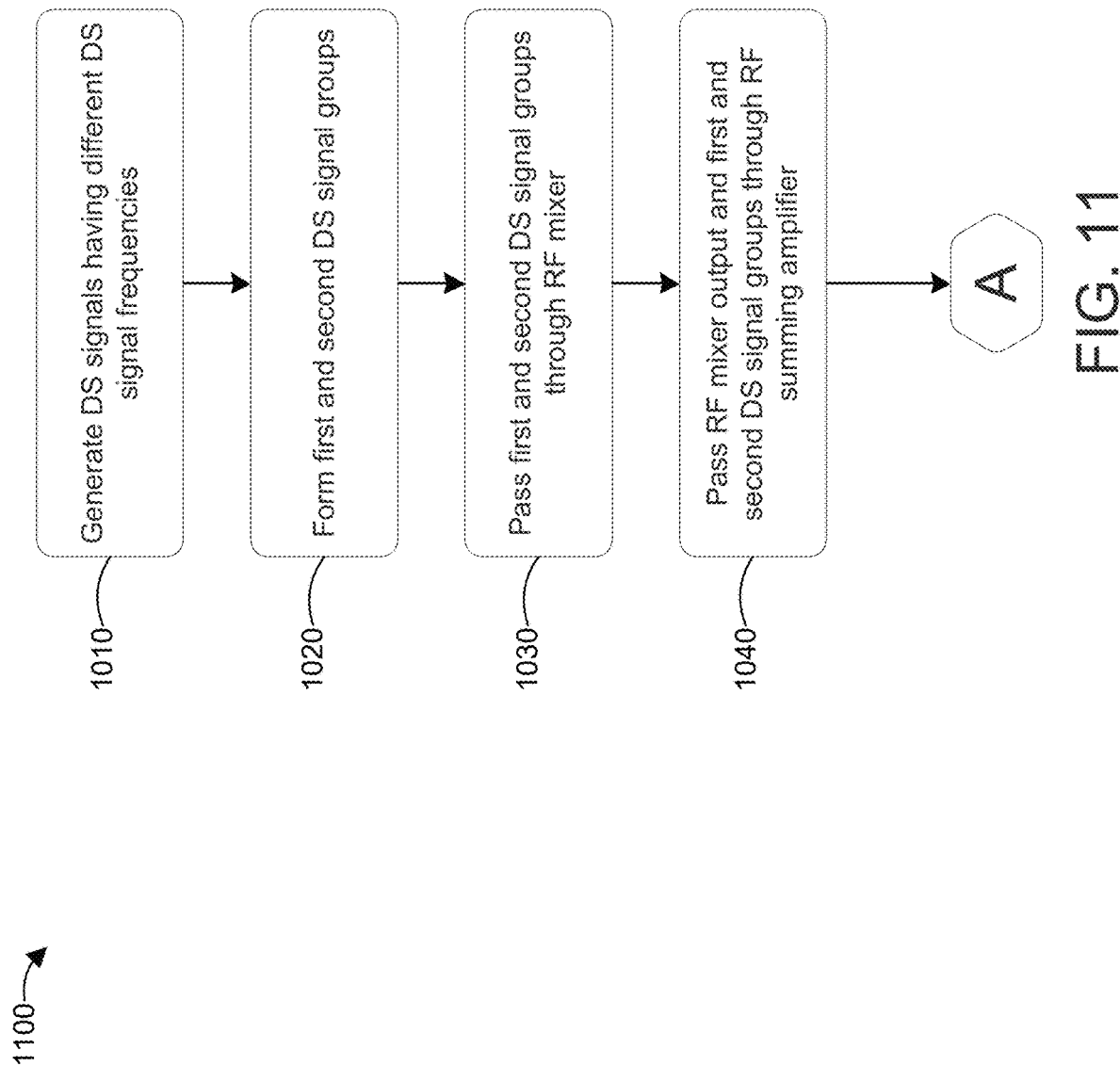
FIG. 11 is a flow chart of a method for transmitting DS signals according to one or more alternative embodiments.

FIG. 11 is a flow chart 1100 of a method for transmitting DS signals according to one or more alternative embodiments. The method can be performed using DS transmitter 40. Steps 1010, 1020, 1030, and 1040 are the same as described above with respect to FIG. 10.

In step 1150 (via placeholder A), the summing amplifier output (from step 1040) and a third DS signal group are passed through a second RF mixer (e.g., RF mixer 430). The third DS signal group includes one or more DS signals, which can be generated in the same manner as DS signals generated in step 1010. The DS signal(s) for the third DS signal group and the DS signals for the first and second DS signal groups can be generated using the same apparatus or different apparatuses. The second RF mixer outputs the sum and difference of the DS signal frequencies of each DS signal in the summing amplifier output and the third DS signal group. Additional details of the second RF mixer are described above with respect to FIGS. 4 and 5.

In step 1160, the second RF mixer output, the summing amplifier output (from step 1040), and the third DS signal group are passed through a second RF summing amplifier (e.g., RF summing amplifier 440).

In step 1170, the summed signal output from the second RF summing amplifier (step 1160) is transmitted over-the-air using an antenna.

Figure 12:
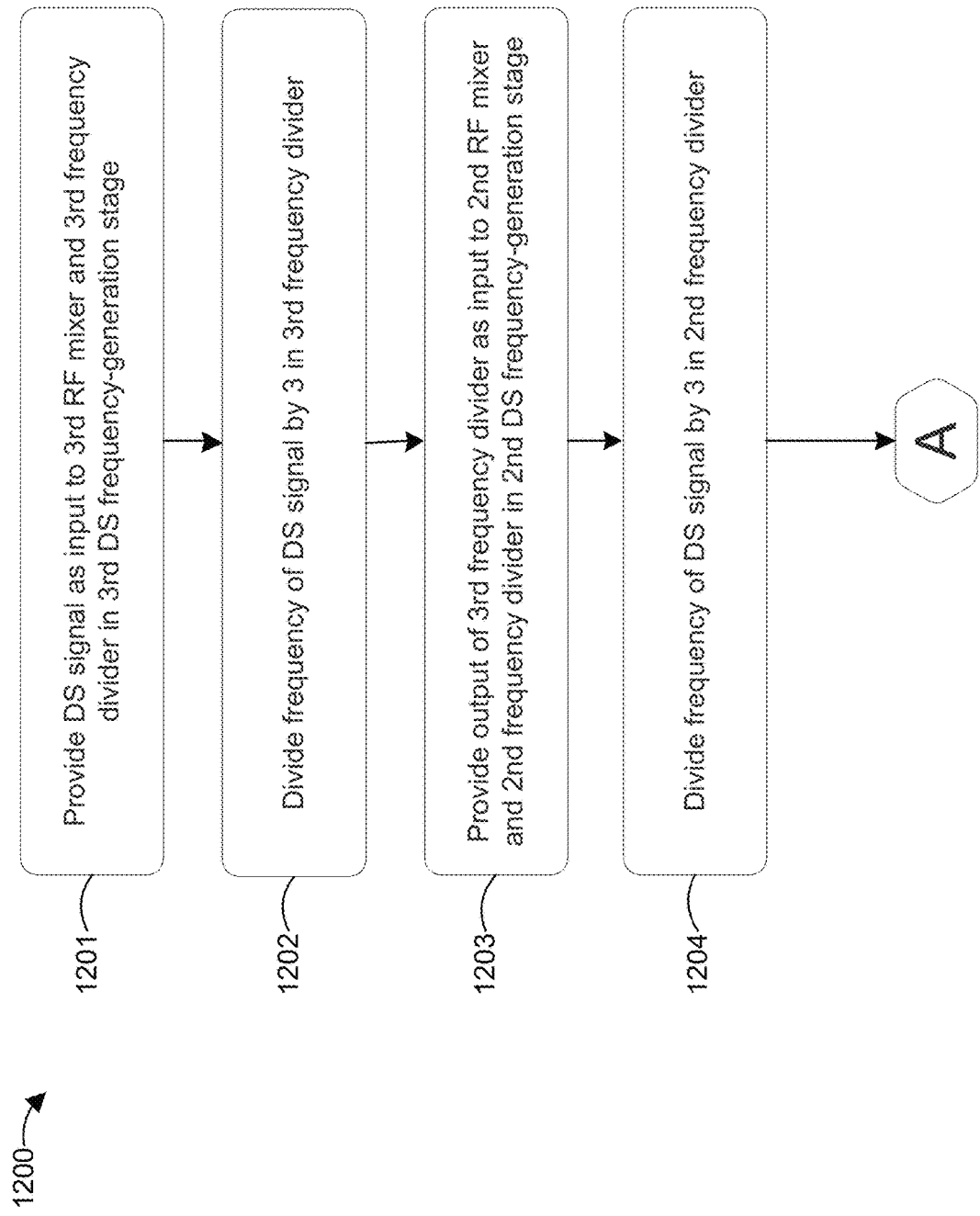
FIG. 12 is a flow chart of a method for transmitting DS signals according to one or more embodiments.
Figure 12:
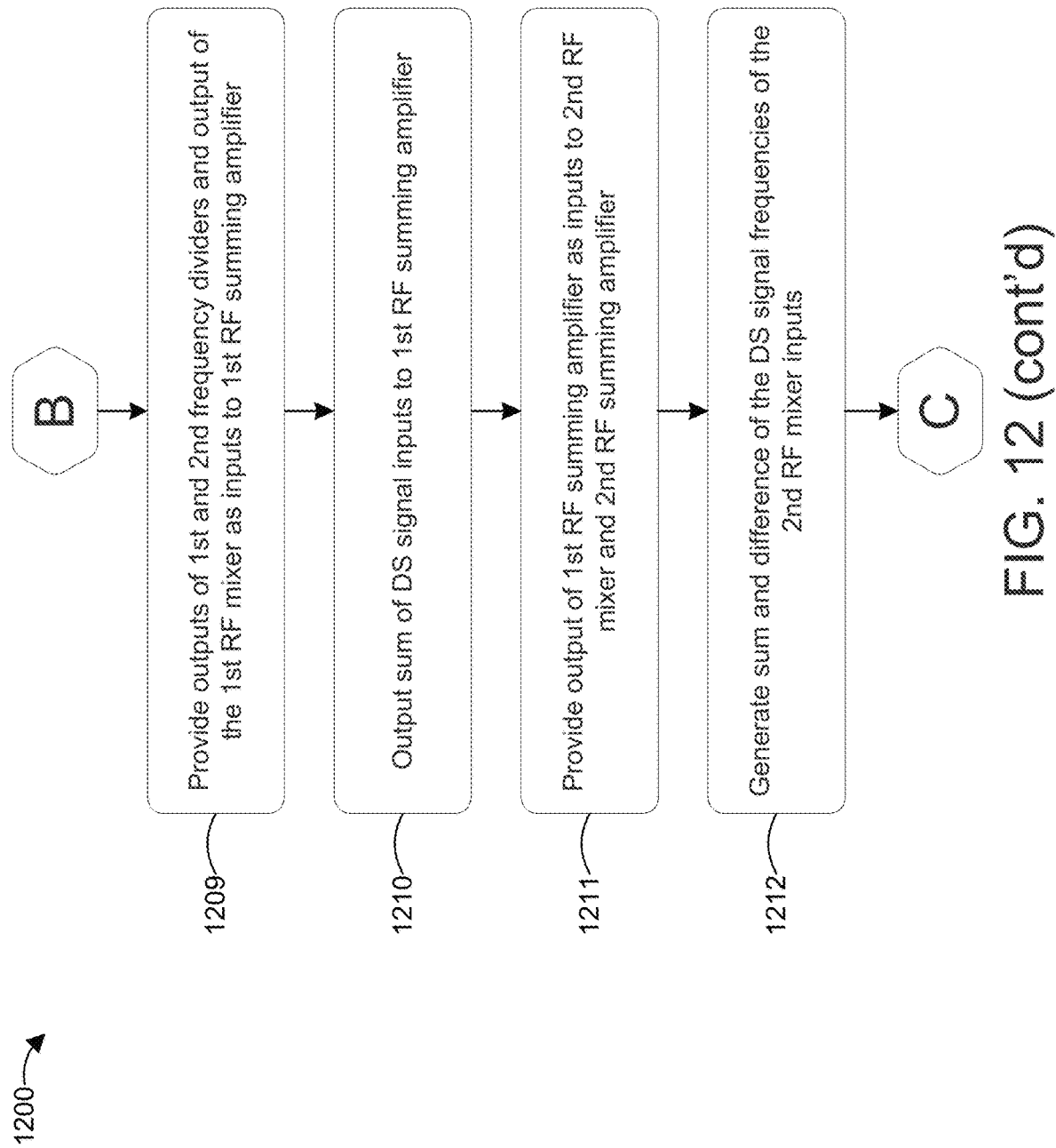
Figure 12:
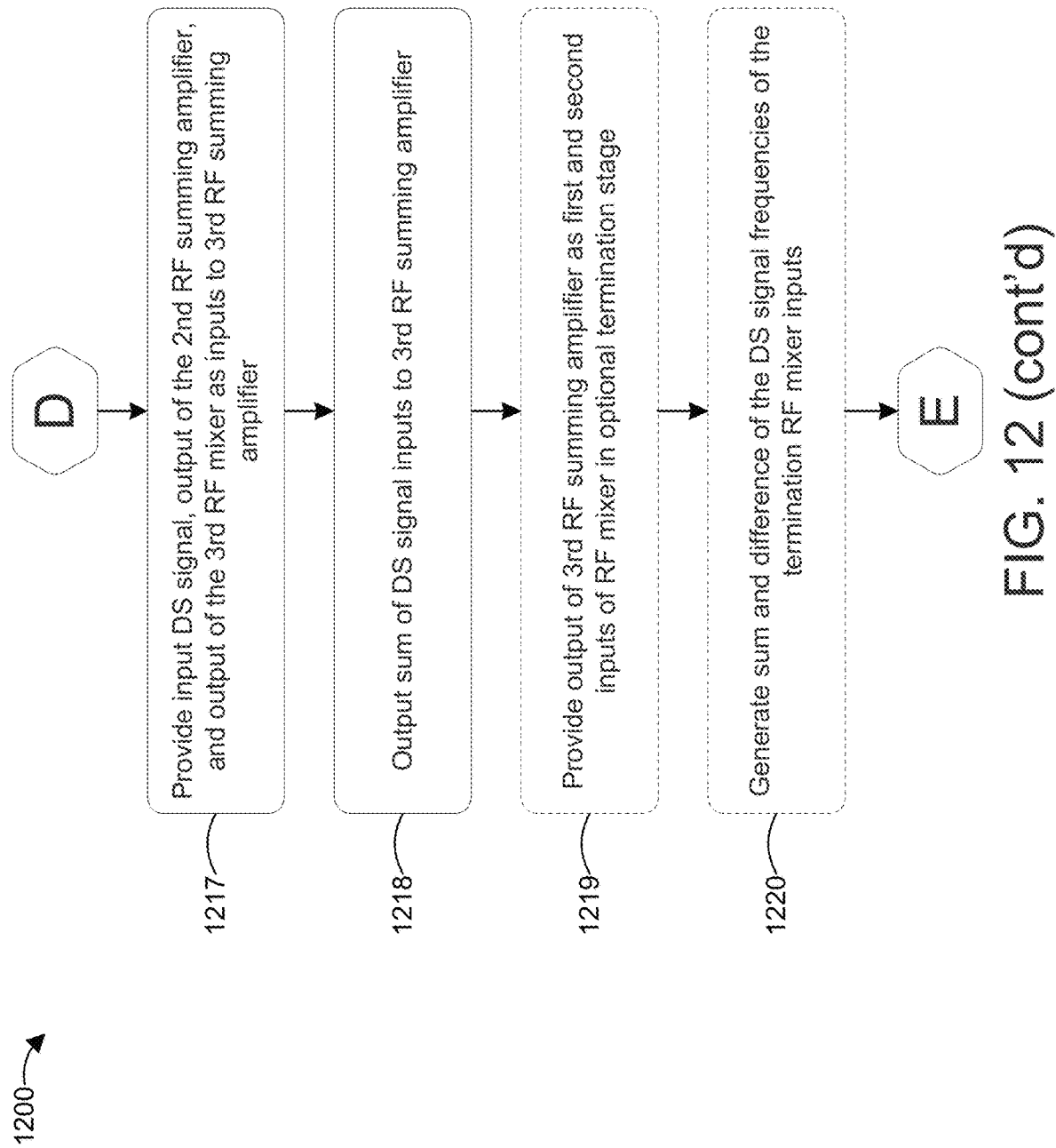
Figure 12:
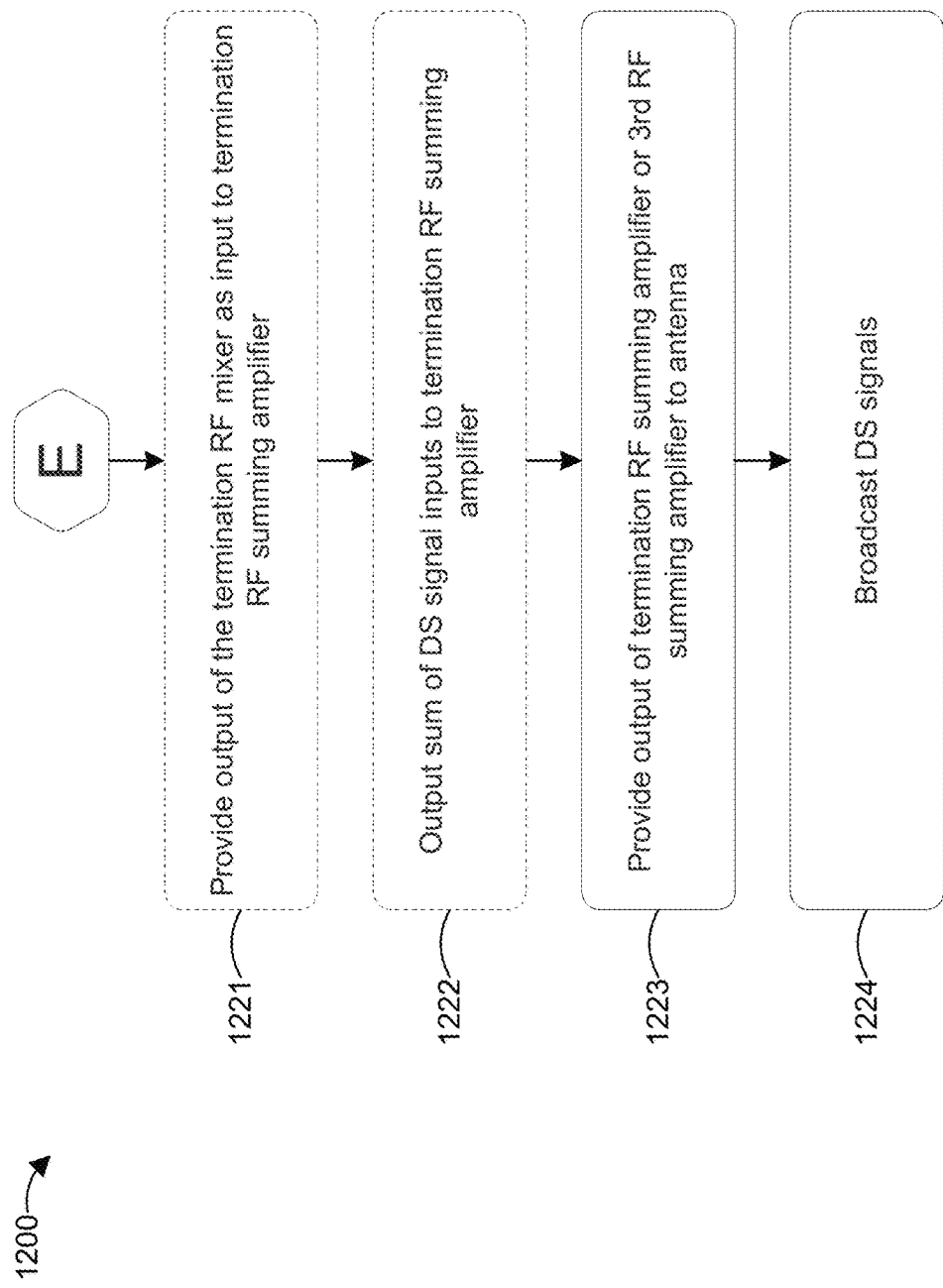

FIG. 12 is a flow chart 1200 of a method for transmitting DS signals according to one or more embodiments. The method can be performed using DS transmitter 80.

In step 1201, a DS signal is provided as an input to a 3rd RF mixer (e.g., RF mixer 860) and a 3rd frequency divider (e.g., frequency divider 850) in a 3rd DS frequency-generation stage (e.g., stage 830). The input DS signal can have a frequency that is $3n \times f_0$ where n is the total number of frequency-generation stages and $f_0$ is the fundamental or base frequency of the DS signal frequencies. For example, when there are 3 frequency-generation stages (e.g., as illustrated in FIG. 8), the input DS signal has a frequency of $27f_0$ (or $f_{27}$).

In step 1202, the frequency of the input DS signal is divided by 3 in the frequency divider. For example, when there are 3 frequency-generation stages, output of the 3rd frequency divider is $9f_0$ (or $f_9$).

In step 1203, the output of the 3rd frequency divider is provided as an input to a 2nd RF mixer and to a 2nd frequency divider in a 2nd DS frequency-generation stage (e.g., stage 820). In step 1204, the frequency of the DS signal input to the 2nd frequency divider is divided by 3. For example, when there are 3 frequency-generation stages, the DS signal input to the 2nd frequency divider is $9f_0$ and the output of the 2nd frequency divider is $3f_0$.

In step 1205 (via placeholder A), the output of the 2nd frequency divider is provided as an input to a 1st RF mixer and to a 1st frequency divider in a 1st DS frequency-generation stage (e.g., stage 810). In step 1206, the frequency of the DS signal input to the 1st frequency divider is divided by 3. For example, when there are 3 frequency-generation stages, the DS signal input to the 1st frequency divider is $3f_0$ and the output of the 1st frequency divider is $f_0$.

In step 1207, the outputs of the 1st and 2nd frequency dividers ($f_0$ and $3f_0$, respectively) are provided as inputs to the 1st RF mixer. In step 1208, the 1st RF mixer generates the sum and difference of the DS signal frequencies of the 1st RF mixer inputs ($f_0$ and $3f_0$) as an output. The output of the 1st RF mixer is $4f_0$ and $2f_0$.

In step 1209 (via placeholder B), the outputs of the 1st and 2nd frequency dividers ($f_0$ and $3f_0$, respectively) and the output of the 1st RF mixer ($4f_0$ and $2f_0$) are provided as inputs to a 1st RF summing amplifier, which can be disposed in the 1st DS frequency-generation stage. In step 1210, the 1st RF summing amplifier outputs a sum of the DS signal inputs. The sum is $f_0$-$4f_0$ (or $f_1$-$f_4$).

In step 1211, the output of the 1st RF summing amplifier ($f_0$-$4f_0$) is provided as an input to the 2nd RF mixer and to a 2nd RF summing amplifier, which can be disposed in the 2nd DS frequency-generation stage. In step 1212, the 2nd RF mixer generates the sum and difference of the DS signal frequencies of the 2nd RF mixer inputs—the output of the 1st RF summing amplifier ($f_0$-$4f_0$) and the output of the 3rd frequency divider ($9f_0$). The output of the 2nd RF mixer is $5f_0$-$8f_0$ and $10f_0$-$13f_0$ (or $f_5$-$f_8$ and $f_{10}$-$f_{13}$).

In step 1213 (via placeholder C), the output of the 3rd frequency divider ($9f_0$), the output of the 1st RF summing amplifier ($f_0$-$4f_0$), and the output of the 2nd RF mixer ($5f_0$-$8f_0$ and $10f_0$-$13f_0$) as inputs to the 2nd RF summing amplifier. In step 1214, the 2nd RF summing amplifier outputs a sum of the DS signal inputs. The sum is $f_0$-$13f_0$ (or $f_1$-$f_{13}$).

In step 1215, the output of the 2nd RF summing amplifier ($f_0$-$13f_0$) is provided as an input to the 3rd RF mixer and to a 3rd RF summing amplifier, which can be disposed in the 3rd DS frequency-generation stage. In step 1216, the 3rd RF mixer generates the sum and difference of the DS signal frequencies of the 3rd RF mixer inputs—the output of the 2nd RF summing amplifier ($f_0$-$13f_0$) and the input DS signal ($27f_0$). The output of the 2nd RF mixer is $14f_0$-$26f_0$ and $28f_0$-$40f_0$ (or $f_{14}$-$f_{26}$ and $f_{28}$-$f_{40}$).

In step 1217 (via placeholder D), the input DS signal ($28f_0$), the output of the 2nd RF summing amplifier ($f_0$-$13f_0$), and the output of the 3rd RF mixer ($14f_0$-$26f_0$ and $28f_0$-$40f_0$) as inputs to the 3rd RF summing amplifier. In step 1218, the 3rd RF summing amplifier outputs a sum of the DS signal inputs. The sum is $f_0$-$40f_0$ (or $f_1$-$f_{40}$).

In optional step 1219, the output of the 3rd RF summing amplifier is provided as first and second inputs to a termination RF mixer in an optional termination stage (e.g., termination stage 840). In optional step 1220, the termination RF mixer generates the sum and difference of the DS signal frequencies of the 3rd RF mixer inputs, each of which is the output of the 3rd RF summing amplifier. The output of the 3rd RF mixer is $f_0$-$40f_0$.

In optional step 1221 (via placeholder E), the output of the termination RF mixer ($f_0$-$40f_0$) is provided as an input to a termination RF summing amplifier. In optional step 1222, the termination RF summing amplifier outputs a sum of the DS signal inputs. The sum is $f_0$-$40f_0$ (or $f_1$-$f_{40}$).

In step 1223, the output of the termination RF summing amplifier (if optional steps 1219-1221 are implemented) or the output of the 3rd RF summing amplifier (if optional steps 1219-1221 are not implemented) is provided to an antenna, which broadcasts the DS signals (e.g., $f_0$-$40f_0$) over-the-air in step 1224.

Figure 13:
FIG. 13 is a flow chart of a method for receiving DS signals according to one or more embodiments.
Figure 13:
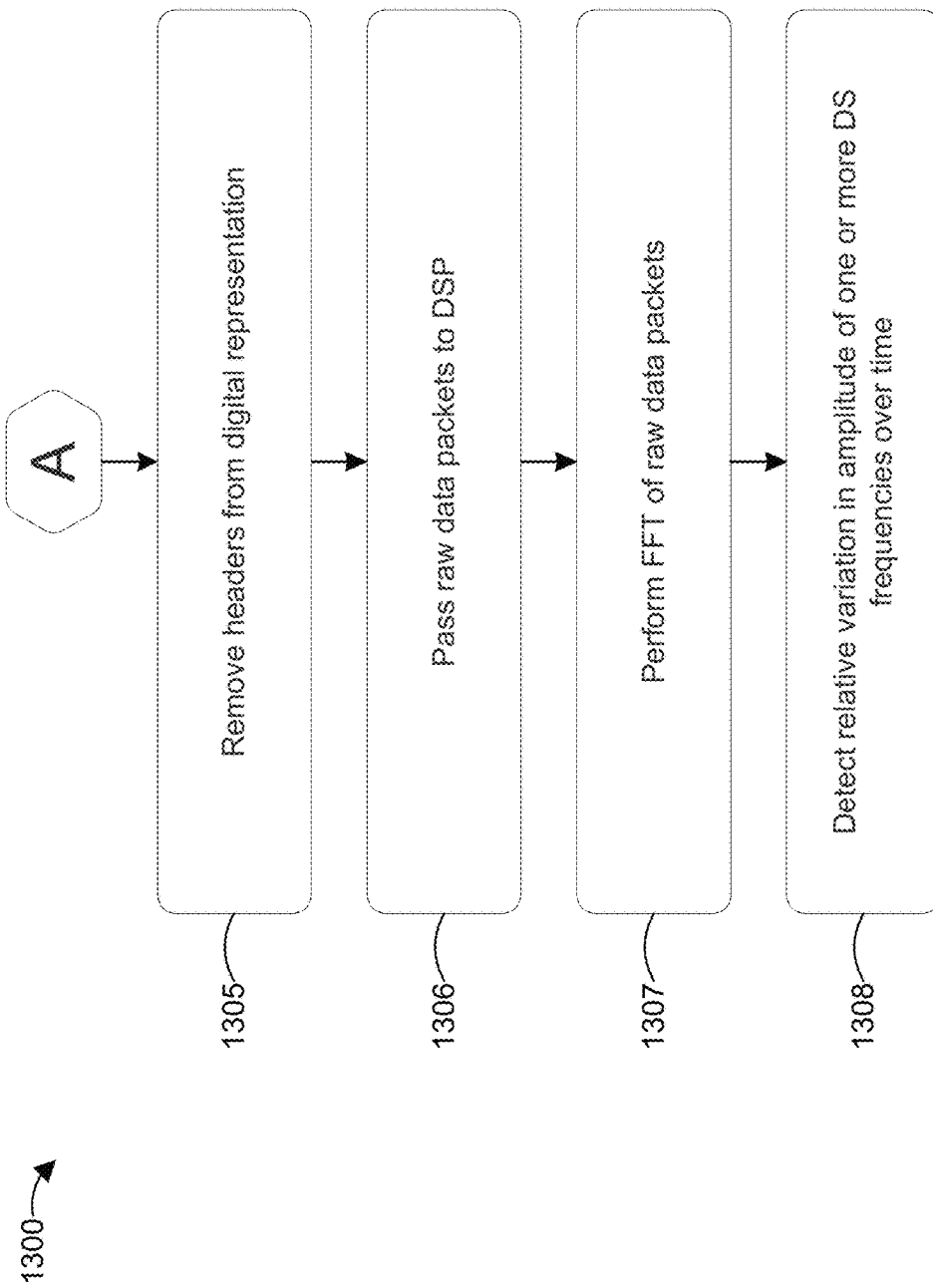

FIG. 13 is a flow chart 1300 of a method for receiving DS signals according to one or more embodiments. The method can be performed using DS receiver 110 and motherboard 150 in DS transceiver 10.

In step 1301, DS signals transmitted over-the-air are received at a receiver antenna. In step 1302, the received DS signals are passed to an RF front end that is electrically coupled to the receiver antenna. In step 1303, the RF front end generates an analog representation of the DS signals received by the antenna.

In step 1304, the analog representation of the received DS signals is converted to a digital representation, such as in an ADC. The digital representation includes headers and data packets. In step 1305 (via placeholder A), the headers in the digital representation are removed through detection processing, leaving only the raw data packets. In step 1306, the raw data packets are passed to a DSP, which performs an FFT of the raw data in step 1307. The FFT transforms the transform the representation of the received signals from the signal domain (frequency vs. time) into the frequency domain (frequency vs. amplitude).

In step 1308, the DSP or another processor detects whether there has been a relative variation in the amplitude over a predetermined time period of any of the received discrete frequencies. Such a relative variation can correspond to a data signal.

Figure 14:
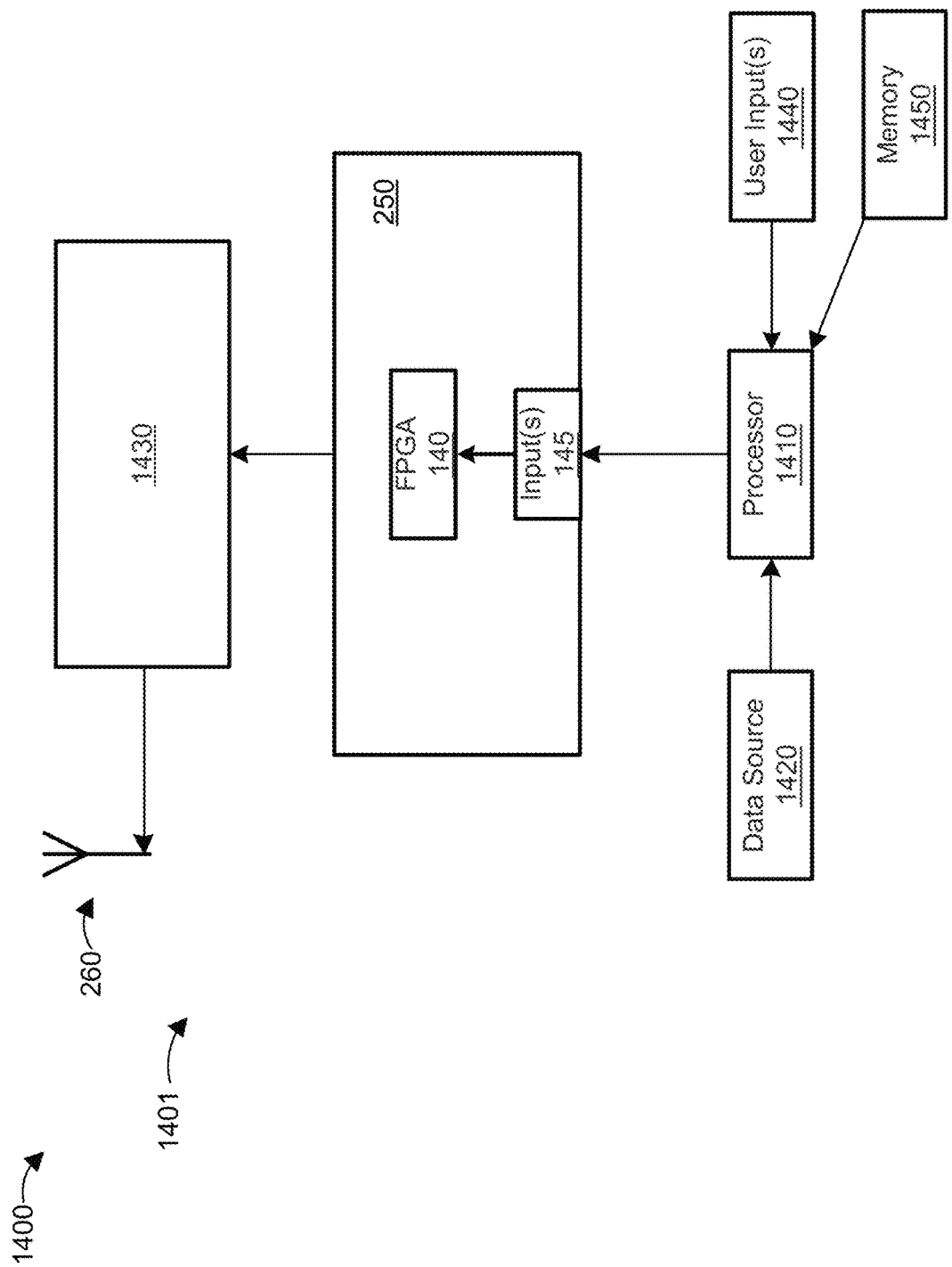
FIG. 14 is a block diagram of a system for transmitting DS signals according to one or more embodiments.

FIG. 14 is a block diagram of a system 1400 for transmitting DS signals according to one or more embodiments. The system 1400 includes a DS transmitter 1401, a microprocessor 1410, and a data source 1420. The DS transmitter 1401 includes motherboard 250 and a daughterboard 1430. The daughterboard 1430 can be the same as any of the daughterboards described herein (e.g., daughterboard 100, 200, 401, 900, 910, or 920). The output of the daughterboard 1430 includes a plurality of DS frequencies that are transmitted simultaneously (e.g., individually and/or summed or superimposed) over-the-air via the transmitter antenna 260.

The input(s) 145 to the FPGA 140 are in electrical communication with the microprocessor 1410 that generates output signals to control the FPGA 140. The output signals can be based, at least in part, on one or more user inputs 1440 (e.g., via a user interface on a computer display, a mouse, a dial, or other user input device), computer-readable program instructions (e.g., software) stored in memory 1450, and/or one or more settings stored in memory 1450. The output signals can cause the FPGA 140 to generate one or more DS signals having different respective discrete frequencies. The output signals can also cause the FPGA 140 to modulate the amplitude of one or more of the DS signals with respect to time to transfer data such as from data source 1420. The data source 1420 can be a sensor, radar, a microphone, or other device. In some embodiments, the data from the data source 1420 is temporarily stored in memory (e.g., memory 1450) before it is transferred to the microprocessor 1410.

Figure 15:
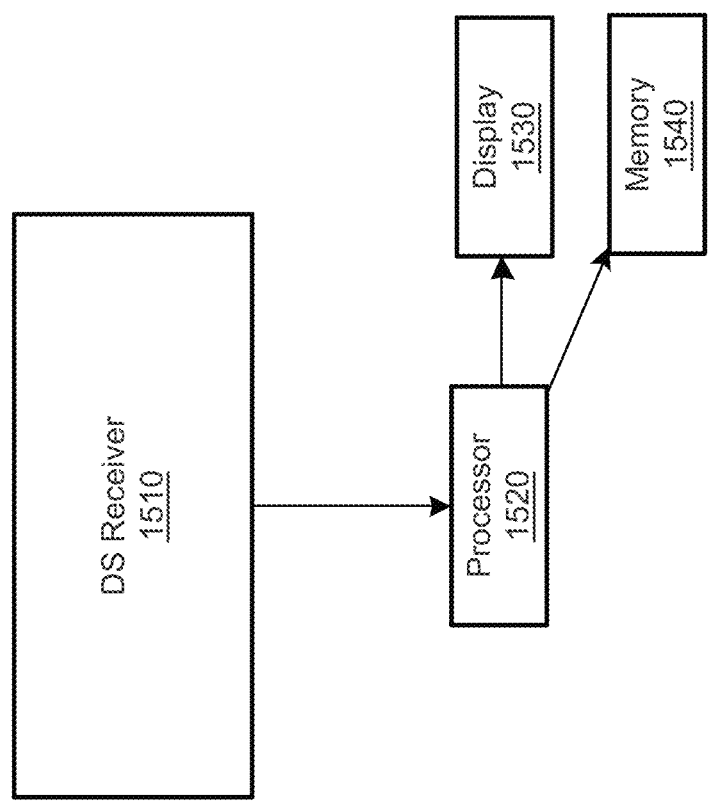
FIG. 15 is a block diagram of a system for receiving DS signals according to one or more embodiments.

FIG. 15 is a block diagram of a system 1500 for receiving DS signals according to one or more embodiments. The system 1500 includes a DS receiver 1510, a microprocessor 1520, a display 1530, and memory 1540. The DS receiver 1510 can include receiver 110 and motherboard 150. The DS receiver 1510 receives DS signals having discrete spectrum frequencies (e.g., contiguous or discontinuous discrete Fourier series frequencies). The received DS signals include amplitude-modulated signals that correspond to data (e.g., digital data). The data is processed by the microprocessor 1520 to display on display 1530 and/or to store in memory 1540. The data can correspond to an output of a data source (e.g., data source 1420), such as a sensor, a radar, a microphone, or other device.

In some embodiments, systems 1400 and 1500 can be combined to form a combined transceiver system that transmits and receives DS signals.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. For example, those of ordinary skill in the art will readily envision a variety of other means and/or structures for performing the function and/or obtaining the results and/or one or more of the advantages described herein, and each of such variations and/or modifications is deemed to be within the scope of the embodiments described herein.

Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

The above-described embodiments may be implemented in any of numerous ways. One or more aspects and embodiments of the present application involving the performance of processes or methods may utilize program instructions executable by a device (e.g., a computer, a processor, or other device) to perform, or control performance of, the processes or methods.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in field programmable gate arrays (FPGAs) or other semiconductor devices, or other tangible computer storage medium) encoded with one or more programs that, when executed on one or more computers or other processors, perform methods that implement one or more of the various embodiments described above.

The computer readable medium or media may be transportable, such that the program or programs stored thereon may be loaded onto one or more different computers or other processors to implement various ones of the aspects described above. In some embodiments, computer readable media may be non-transitory media.

The terms "program" or "software" are used herein in a generic sense to refer to any type of computer code or set of computer-executable instructions that may be employed to program a computer or other processor to implement various aspects as described above. Additionally, it should be appreciated that according to one aspect, one or more computer programs that when executed perform methods of the present application need not reside on a single computer or processor, but may be distributed in a modular fashion among a number of different computers or processors to implement various aspects of the present application.

Computer-executable instructions may be in many forms, such as program modules, executed by one or more computers or other devices. Generally, program modules include routines, programs, objects, components, data structures, etc. that performs particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The present invention should therefore not be considered limited to the particular embodiments described above. Various modifications, equivalent processes, as well as numerous structures to which the present invention may be applicable, will be readily apparent to those skilled in the art to which the present invention is directed upon review of the present disclosure.

What is claimed is:

1. A discrete spectrum (DS) signal transmitter comprising:
   a first circuit element comprising a DS signal generator that generates a plurality of DS signals, each DS signal having a different DS frequency, each DS frequency being (a) a harmonic of a fundamental frequency or (b) the fundamental frequency;
   a second circuit element that receives as an input the DS signals and that generates as an output (a) a finite summation of the DS signals or (b) pulses that represent a mathematical equivalent of a summation of an infinite number of the DS signals, the second circuit element comprising:
   a first RF mixer electrically coupled to the output of the DS signal generator, wherein:
      the first RF mixer receives a first group of the DS signals at a first RF mixer input and a second group of the DS signals at a second RF mixer input, and
      the output of the first RF mixer includes a sum and a difference of the respective DS signal frequencies in each group;
   a first RF summing amplifier electrically coupled to the output of the RF mixer and to the output of the DS signal generator;
   a second RF mixer that receives as inputs:
      an output of the first RF summing amplifier, and
      a third group of the DS signals, the third group of the DS signals including at least one of the DS signals; and
   a second RF summing amplifier that receives as inputs:
      the output of the first RF summing amplifier,
      the third group of the DS signals, and
      an output of the second RF mixer; and
   an antenna electrically coupled to the output of the second circuit element.

2. The DS signal transmitter of claim 1, wherein the DS signal generator comprises a field-programmable gate array (FPGA).

3. The DS signal transmitter of claim 2, wherein the FPGA has an input to modify the DS frequencies of the DS signals.

4. The DS signal transmitter of claim 1, wherein:
   the first group of the DS signals is input to a first RF amplifier,
   an output of the first RF amplifier is electrically coupled to the first RF mixer input,
   the second group of the DS signals is input to a second RF amplifier, and
   an output of the second RF amplifier is electrically coupled to the second RF mixer input.

5. The DS signal transmitter of claim 1, wherein an output of the RF summing amplifier is electrically coupled to the antenna.

6. The DS signal transmitter of claim 5, wherein the output of the RF summing amplifier comprises a contiguous set of DS frequencies.

7. The DS signal transmitter of claim 5, wherein the output of the RF summing amplifier comprises at least a partially-discontinuous set of DS frequencies.

8. The DS signal transmitter of claim 1, wherein the output of the second RF mixer includes a sum and a difference of the respective DS signal frequencies in the output of the first RF summing amplifier and the third group of the DS signals.

9. The DS signal transmitter of claim 8, wherein an output of the second RF summing amplifier is electrically coupled to the antenna.

10. The DS signal transmitter of claim 9, wherein the output of the second RF summing amplifier comprises a contiguous set of DS frequencies.

11. The DS signal transmitter of claim 9, wherein the output of the second RF summing amplifier comprises at least a partially-discontinuous set of DS frequencies.

12. The DS signal transmitter of claim 1, wherein the second circuit element further comprises a pulse generator that receives as an input the DS signals and that outputs pulses of the DS signals to the antenna.

13. The DS signal transmitter of claim 1, wherein the second circuit element further comprises a plurality of signal-generation stages, each signal-generation stage comprising a frequency divider, an RF mixer, and an RF summing amplifier.

14. The DS signal transmitter of claim 13, wherein:
   an input of the frequency divider in a first signal-generation stage is electrically coupled to an output of the frequency divider in a second signal-generation stage, and
   an input of the frequency divider in a second signal-generation stage is electrically coupled to an output of the frequency divider in the third signal-generation stage.

15. The DS signal transmitter of claim 14, wherein:
   the RF mixer in the first signal-generation stage receives as inputs:
      an output of the frequency divider in the first signal-generation stage, and
      the output of the frequency divider in the second signal-generation stage, and
   the RF summing amplifier in the first signal-generation stage receives as inputs:
      the output of the frequency divider in the first signal-generation stage,
      the output of the frequency divider in the second signal-generation stage, and
      an output of the RF mixer in the first signal-generation stage.

16. The DS signal transmitter of claim 15, wherein:
the RF mixer in the second signal-generation stage receives as inputs:
an output of the RF summing amplifier in the first signal-generation stage, and
the output of the frequency divider in the third signal-generation stage, and
the RF summing amplifier in the second signal-generation stage receives as inputs:
the output of the RF summing amplifier in the first signal-generation stage,
the output of the frequency divider in the third signal-generation stage, and
an output of the RF mixer in the second signal-generation stage.

17. The DS signal transmitter of claim 16, wherein:
the RF mixer in the third signal-generation stage receives as inputs:
an output of the RF summing amplifier in the second signal-generation stage, and
an input DS signal generated by the DS signal generator, and
the RF summing amplifier in the third signal-generation stage receives as inputs:
the output of the RF summing amplifier in the second signal-generation stage,
the input DS signal, and
an output of the RF mixer in the third signal-generation stage.

18. The DS signal transmitter of claim 17, wherein the DS frequency of the input DS signal is the 27th harmonic of the fundamental frequency.

19. The DS signal transmitter of claim 17, wherein each frequency divider divides the DS frequency of the DS signal at the input by 3.

20. The DS signal transmitter of claim 17, wherein an output of the RF summing amplifier in the third signal-generation stage in electrically coupled to the antenna.

21. The DS signal transmitter of claim 20, wherein the output of the RF summing amplifier in the third signal-generation stage comprises a contiguous set of 40 DS frequencies.

22. The DS signal transmitter of claim 17, wherein an output of the RF summing amplifier in the third signal-generation stage in electrically coupled to a termination stage, the termination stage comprising a termination RF mixer and a termination RF summing amplifier.

23. The DS signal transmitter of claim 22, wherein:
the termination RF mixer has two inputs, each input electrically coupled to an output of the RF summing amplifier in the third signal-generation stage, and
the termination RF summing amplifier is electrically coupled to an output of the termination RF mixer.

24. A DS signal transceiver comprising:
the DS signal transmitter of claim 1; and
a DS signal receiver comprising:
a receiver antenna;
an RF front end having an input electrically coupled to an output of the receiver antenna;
an analog-to-digital converter (ADC) having an input electrically coupled to an output of the RF front end; and
a digital signal processor (DSP) having an input electrically coupled to an output of the ADC,
wherein:
the DSP generates a signal-domain output by performing a fast Fourier transform of a digital representation of DS signals received by the receiver antenna, the digital representation output by the ADC,
the DS signal generator of the DS signal transmitter comprises a field-programmable gate array (FPGA),
the digital representation output by the ADC includes header and data packets, and
the FPGA performs detection processing to remove the header packets from the digital representation such that only the data packets are input to the DSP.

* * * * *